(12) United States Patent
Ikeda et al.

(10) Patent No.: US 8,850,973 B2
(45) Date of Patent: Oct. 7, 2014

(54) WATER PRESSURE TRANSFER METHOD, A WATER PRESSURE TRANSFER ARTICLE AND A COATING AGENT FOR WATER PRESSURE TRANSFER FILM

(75) Inventors: Wataru Ikeda, Shizuoka (JP); Akiko Tomiki, Shizuoka (JP)

(73) Assignee: Taica Corporation, Tokyo (JP)

( * ) Notice: Subject to any disclaimer, the term of this patent is extended or adjusted under 35 U.S.C. 154(b) by 405 days.

(21) Appl. No.: 13/266,807

(22) PCT Filed: Apr. 30, 2010

(86) PCT No.: PCT/JP2010/057660
§ 371 (c)(1),
(2), (4) Date: Oct. 28, 2011

(87) PCT Pub. No.: WO2010/126125
PCT Pub. Date: Nov. 4, 2010

(65) Prior Publication Data
US 2012/0048136 A1     Mar. 1, 2012

(30) Foreign Application Priority Data

Apr. 30, 2009   (JP) ................................. 2009-111536

(51) Int. Cl.
| | |
|---|---|
| *B41C 1/06* | (2006.01) |
| *B41F 1/16* | (2006.01) |
| *B44F 7/00* | (2006.01) |
| *C09D 11/101* | (2014.01) |
| *B44C 1/175* | (2006.01) |

(52) U.S. Cl.
CPC ................ *B44C 1/1752* (2013.01); *B44F 7/00* (2013.01); *C09D 11/101* (2013.01)
USPC .............................. 101/34; 101/492; 156/230

(58) Field of Classification Search
USPC .............. 101/33, 34, 35, 483, 487, 488, 492; 156/230, 384–388; 428/195.1
See application file for complete search history.

(56) References Cited

U.S. PATENT DOCUMENTS

| | | | | |
|---|---|---|---|---|
| 4,269,650 | A * | 5/1981 | Arai et al. | 156/540 |
| 4,490,413 | A * | 12/1984 | Stimson | 427/262 |
| 5,908,525 | A * | 6/1999 | Zaher | 156/230 |
| 6,022,438 | A * | 2/2000 | Watanabe et al. | 156/230 |
| 6,852,394 | B2 * | 2/2005 | Otaki et al. | 428/195.1 |
| 6,935,230 | B1 * | 8/2005 | Walker et al. | 101/33 |

(Continued)

FOREIGN PATENT DOCUMENTS

| | | |
|---|---|---|
| JP | 02-123172 A | 10/1990 |
| JP | 05-016598 A | 1/1993 |

(Continued)

OTHER PUBLICATIONS

International Search Report dated Jun. 9, 2010 of Corresponding PCT/JP2010/057660, filed Apr. 30, 2010.

*Primary Examiner* — Ren Yan
(74) *Attorney, Agent, or Firm* — Pearne & Gordon LLP

(57) ABSTRACT

A method of applying a surface decorative layer on a surface of an article by water pressure transfer in which transfer film 316 which has a print pattern 340 comprising a first area 312A having an ink layer and a second area 312B having no ink layer and has a whole outer surface formed thereon has an activating agent 320 applied onto the surface of the transfer film 316 to activate the ink and to collect a surplus portion of the activating agent in a convex form in the second area, whereby a three-dimensional unevenness is imparted onto the surface of the article.

19 Claims, 15 Drawing Sheets

(56) References Cited

U.S. PATENT DOCUMENTS

| | | |
|---|---|---|
| 2002/0016226 A1 | 2/2002 | Jin et al. |
| 2008/0199664 A1 | 8/2008 | Otaki et al. |
| 2010/0229745 A1 | 9/2010 | Ikeda |
| 2011/0209640 A1* | 9/2011 | Chiu .......................... 101/483 |
| 2012/0263884 A1 | 10/2012 | Otaki |

FOREIGN PATENT DOCUMENTS

| | | |
|---|---|---|
| JP | 05-270199 A | 10/1993 |
| JP | 06-040198 | 2/1994 |
| JP | 06-166300 A | 6/1994 |
| JP | 07-276899 | 10/1995 |
| JP | 2001-092118 A | 4/2001 |
| JP | 2003-313489 A | 11/2003 |
| JP | 2005-125776 A | 5/2005 |
| JP | 2006 007646 A | 1/2006 |
| JP | 2007277501 A | 10/2007 |
| JP | 2008 238683 A | 10/2008 |
| JP | 4166816 B2 | 10/2008 |
| JP | 2009101657 | 5/2009 |
| WO | 2009/054482 | 4/2009 |

\* cited by examiner

| | Each Size of STAR BACK Pattern |
|---|---|
| A Sction | 400 micrometers |
| B Section | 600 micrometers |
| C Section | 470 micrometers |
| D Section | 590 micrometers | ns into the ink, does not remain on the ink but moves onto the area of no ink or the area of ink layer thinner than that of the first area.

WATER PRESSURE TRANSFER METHOD, A WATER PRESSURE TRANSFER ARTICLE AND A COATING AGENT FOR WATER PRESSURE TRANSFER FILM

TECHNICAL FIELD

This invention relates to a water pressure transfer method, a water pressure transfer article and a coating agent for a water pressure transfer film, and more particularly, a water pressure transfer method using a transfer film for obtaining a tactile feeling of fine unevenness on a surface of an article, a water pressure transfer article produced by this method and having a surface of three-dimensional unevenness and a coating agent for a water pressure transfer film used suitably for the water pressure transfer method.

BACKGROUND OF THE INVENTION

Generally, the water pressure transfer method is a method for floating on a water surface in a transfer tub a transfer film formed by applying a predetermined print pattern of non-water solubility on a water-soluble film of polyvinyl alcohol, making wet the water-soluble film of the transfer film with water, immersing an article (an object to be pattern-transferred) into the water in the transfer tub while contacting the transfer film, and transferring the print pattern of the transfer film on a surface of the article using the water pressure generated when the article is immersed into water to form a print layer.

In this water pressure transfer method, although the transfer film is obtained by printing the print pattern on the water-soluble film by gravure printing method etc., this transfer film is generally supplied to the water pressure transfer operation site by being shipped in a roll state after the ink of the print pattern is dried.

The transfer film has a whole outer surface pattern fixture layer in order to make stable the ink pattern on the polyvinyl alcohol of the water soluble film when the water soluble film is made wet or dissolved. Although the whole outer surface pattern fixture layer will be described later in details, the whole outer surface pattern fixture layer of transparent or translucent ink is applied on the whole surface of the transfer film so that the whole area has a uniform thickness in spite of the no ink area and the ink area of color ink layer of the print pattern partially having the visible surface (substrate surface) of the article, that is the print pattern partially having no color ink resulting in having the print pattern partially removed. The whole outer surface pattern fixture layer serves to prevent the print pattern from being unable to be fixed as the polyvinyl alcohol of the water soluble film swells or is dissolved if there is no whole outer surface pattern fixture layer. This whole outer surface pattern fixture layer also serves to prevent the water soluble film from unstably swelling or being dissolved due to the difference between the thicknesses of the area of ink layer and the area of no ink. Thus, this whole outer surface pattern fixture layer is indispensable for the transfer layer for obtaining the desired design.

The water pressure transfer is performed for the purpose of decorating the surface of the article which is the object to be pattern-transferred. However, lately, a cubic effect is required to be imparted to the surface of the article together with the decoration of the article. To comply with this requirement, various unevenness imparting arts have been conventionally adopted (see Patent Documents 1 through 4).

For the conventional unevenness imparting arts, there has been a first conventional prior art in which the unevenness is imparted by printing a pattern on a fine uneven surface of a decorative sheet having the fine uneven surface formed beforehand (see Patent Document 1), a second prior art in which wood flour is mixed into an ink layer etc. of a print pattern of a transfer film to give a fine unevenness to the surface of the water pressure transfer article (see Patent Document 2) or a third prior art in which a fine unevenness is formed on the surface of the article with a base coat layer having an surface unevenness applied to the article before the transfer of the print pattern or a topcoat having variant unevenness formed by a press-molding machine etc. after the transfer, but before hardening the print pattern (see Patent Documents 3).

However, the methods according to these prior arts have the disadvantages that the separate steps such as an emboss process for the decorative sheet (the first prior art) and mechanically imparting the unevenness to the base coat or topcoat (the third prior art) are required and there are the difficulties of obtaining the unevenness other than dot-like one (the second prior art) and the stripe-like unevenness pattern such as wooden skin. Furthermore, none of the prior arts forms the three-dimensional fine unevenness on the print pattern itself and therefore the real tactile feeling of unevenness cannot be obtained.

The applicant has proposed a water pressure transfer method adapted to form the three-dimensional fine unevenness on the print pattern itself without any particular step and to thereby obtain the real tactile feeling of unevenness (Japanese Patent Application No. 2007-277501 of the Patent Document No. 5)

The water pressure transfer method according to the applicant's proposal is a method in which there is prepared a transfer film having a print pattern including a first area of an ink layer and a second area of no ink layer or an ink layer thinner than that of the first area and having no whole outer surface pattern fixture layer, there is formed activating agent convex collection portions by protruding on a surface of an article a surplus portion of the activating agent which is applied onto the surface of the transfer film to activate the ink of the first area while the surplus portion of the activating agent is collected in the second area by being pushed by the surface of the article on the water pressure transfer and there is shrunk the activating agent convex collection portion when the print pattern on the article is hardened whereby an ink print portion corresponding to the second area projects over an ink print portion corresponding to the first area to thereby impart a three-dimensional unevenness shape to the surface of the article surface.

In this new water pressure transfer method, in order to form the activating agent convex collection portions in the second area, the activating agent convex collection portions may be formed by collecting in a convex manner in the second area by a repelling function of the ink layer of the first area and a collection power of the activating agent the surplus portion of the activating agent within the first area. In this case, the collection of the surplus portion of the activating agent may be carried out by setting an interfacial tension of the ink relative to the activating agent in the first and second areas so that the activating agent collection power in the second area acts more greatly than a power for the ink layer of the first area to draw the activating agent and setting the interfacial tension may be carried out so that the interfacial tension relative to the activating agent in the first area gets lower than the interfacial tension relative to the activating agent in the second area. What is meant by "the repelling function" in this specification is the phenomena where the surplus portion of the activating agent remaining on the ink after the activating agent permeates the ink composite until the activating agent is wholly united with the ink composite is pulled from the surface of the portions having the ink layer near the surface of the portions having no ink layer due to the difference of the polarities of the surface of the portions having the ink layer and the surface of the portion having no ink layer. Thus, "the repelling function" never prevents the activating agent from permeating the ink layer.

The activating agent to be used for this new water pressure transfer method is not an organic solvent, but may preferably be one formed of ultraviolet ray hardening resin composite. The activating agent of ultraviolet ray hardening resin has the ultraviolet ray hardening resin component permeated into the ink of the print pattern to activate the dried ink and also hardened by ultraviolet ray in the ink to impart a mechanical and chemical surface protection function to the surface decorative layer formed of the print pattern transferred onto the surface of the article.

The applicant has also proposed an activating agent of ultraviolet ray hardening resin composite suitable for being used in the water pressure transfer (see Patent Document 4). This activating agent includes no organic solvent and includes at least photo-polymerization pre-polymer (photo-polymerization oligomer), photo-polymerization monomer and photo-polymerization initiator. The photo-polymerization pre-polymer may be of 9 to 40 mass %, the photo-polymerization monomer may be of 50 to 90 mass %, the photo-polymerization initiator may be of 0.5 to 5 mass % and the balance may be of 0.5 to 5 mass %. This may have the viscosity of 10 to 100 CPS (25° C.) and the ink solubility of 10 or more at the SP value.

The photo-polymerization monomer of the ultraviolet ray hardening resin component has a solvent power to an ink of the print pattern as well as that to the photo-polymerization pre-polymer, a higher hardenability, a good adhesion to ABS resins, PC materials, etc., which are base materials onto which the print pattern is to be transferred under water pressure, a lower shrinkage when hardened and a good smoothness and also has a good transparency maintained. Thus, the adhesion of the dried and cured print pattern of the water pressure transfer film can be positively recovered by the proper viscosity and ink solubility of the ultraviolet ray hardening resin composite and since the ultraviolet ray hardening resin composite permeates and penetrates the whole thickness of the print pattern from the surface on the side of application of the ultraviolet ray hardening resin composite to the surface on the opposite side so that the print pattern and the ultraviolet ray hardening resin composite are integrally combined with each other over the whole of the print pattern (the whole areas and the whole thickness thereof), the decorative layer obtained by the print pattern transferred on the article is hardened by the ultraviolet ray all over the decorative layer including the outer surface and therefore the print pattern can be solidly attached on the surface of the article and in addition thereto the surface protection function according to the ultraviolet ray hardening can be imparted to the decorative layer itself. Thus, the decorative layer obtained by transferring the print pattern is hardened all over the whole including the outer surface thereof whereby the print pattern can be positively adhered to the surface of the article and in addition thereto, the surface protection function by ultraviolet ray hardening is imparted to the decorative layer itself.

The particular viscosity of 10 to 100 CPS (25° C.) and the particular ink solubility of 10 or more at the SP value of the ultraviolet ray hardening resin composite are the values necessary for making the solubility of the ultraviolet ray hardening resin composite closer to that of the ink component of the print pattern and the particular viscosity of the ultraviolet ray hardening resin composite is the value necessary for maintaining the smoother coating to the ink component of the print pattern and the permeability of the ultraviolet ray hardening resin composite into the ink component.

Furthermore, the particular viscosity of 3 to 30 CPS (25° C.) and the particular ink solubility of 9 or more at the SP value reduces the viscosity of the photo-polymerization pre-polymer having a tendency of high viscosity and also makes the solubility of the ultraviolet ray hardening resin composite closer to that of the ink component of the print pattern. Therefore, there can be obtained the ultraviolet ray hardening resin composite maintaining the property of smoothly applying the ultraviolet ray hardening resin composite on the ink component of the print pattern (smooth applicability) and the property in which the ultraviolet ray hardening resin composite can permeate the ink component in a good manner (permeability). In addition thereto, the ultraviolet ray hardening resin composite has a good adhesion to the ABS resins, the PC materials etc. of the base materials and maintains the smoothness and the transparency when hardened.

In the new water pressure transfer method for imparting a tactile feeling of cubic unevenness by the convex collection portions of the activating agent, in order to enlarge the difference of height between the convex collection portions of the activating agent and the recesses around the convex collection portions, the blend ratio of the photo-polymerization monomer having the high volume shrinkage ratio is required to be 70% or more, for example. However, such a high volume shrinkage ratio reduces the blend ratio of the photo-polymerization pre-polymer, the component to be a main frame of the activating agent, which influences a membrane performance (abrasion resistance and chemical resistance) after hardened with the result that the membrane performance is disadvantageously reduced. Thus, if the activating agent of the ultraviolet ray hardening resin composite previously proposed by the applicant is used for the new water pressure transfer method, the product having the large height difference of the unevenness can be obtained, but sufficient membrane performance cannot be obtained and therefore both of the good tactile feeling of unevenness and the good membrane performance cannot be obtained.

If the blend ratio of the photo-polymerization pre-polymer of the activating agent is so set to be slightly higher in order to heighten the membrane performance of the decorative layer, then the product having the large height difference of unevenness cannot be obtained due to the volume shrinkage ratio of the photo-polymerization pre-polymer less than that of the photo-polymerization polymer and therefore this is undesirable.

On the other hand, since the article with the unevenness to be imparted thereto is a transfer article requiring the tactile feeling of unevenness, there is much considered the chemical resistance against oleic acid used for evaluating the prevention of dirt on the surface of the product due to tactile by a human body. More particularly, as one of the evaluation of the performance of the chemical resistance required for such a transfer article, it is very important that there is evaluated the prevention of dirt due to sweat or remains of a fingerprint of a human body by oleic acid included in the sweat or skin fat of the human body. Thus the resistance to oleic acid is an important performance for the article having the unevenness imparted thereto. Thus, even if there are the ability of forming the unevenness and adjusting the height thereof, the performance of the product is insufficient (or poor). In this manner, if the unevenness tries to be imparted by the new water pressure transfer using the activating agent of prior art disclosed in the Patent Document 4, the membrane performance will be considerably reduced as the smoothness is reduced for obtaining the unevenness. Thus, since the unevenness cannot be imparted in a totally balanced manner in addition to the coating performance, permeability and so on.

Another important problem of the invention is to be able to stably maintain the pattern of the print pattern layer on water even though the transfer film has no whole outer surface pattern fixture layer. As the activating agent of prior art according to the Patent Document 4 is applied onto the transfer film having no whole outer surface pattern fixture layer, the stability of the pattern of the print pattern layer is not sufficient.

For the aforementioned reason, it is never desirable that the water pressure transfer is carried out by using the activating agent of the Patent Document 4 previously proposed by the applicant so that the large height difference is imparted to the surface of the article.

PRIOR ART DOCUMENTS

Patent Documents

Patent Document 1 JP(Heisei) 05-270199A1
Patent Document 2 JP(Heisei) 06-040198A1
Patent Document 3 JP(Heisei) 07-276899A1
Patent Document 4 JP 4166816 B1
Patent Document 5 JA 2007-277501 (JP2009-101657A1)
Patent Document 6 PCT/JP2008/69304

SUMMARY OF THE INVENTION

Problems to be Solved by the Invention

A first problem to be solved by this invention is to provide a water pressure transfer method adapted to further improve a tactile feeling of three-dimensional unevenness by enlarging a height difference of unevenness without any reduction of a membrane performance (abrasion resistance, chemical resistance to oleic acid and so on) of a surface decorative layer and also to stably maintain on water a pattern of a print pattern layer of a transfer film required to have no whole outer surface pattern fixture layer for imparting the unevenness to the decorative layer whereby a high design characteristic can be maintained.

A second problem to be solved by the invention is to provide a water pressure transfer article having a tactile feeling of three-dimensional unevenness further improved by a larger height difference of unevenness while maintaining a membrane performance and a high design characteristic of a decorative layer.

A third problem to be solved by the invention is to provide an activating agent for a water pressure transfer adapted to further improve a tactile feeling of three-dimensional unevenness by enlarging a height difference of unevenness without any reduction of a membrane performance (abrasion resistance, chemical resistance to oleic acid and so on) of a surface decorative layer and also to stably maintain on water a pattern of a print pattern layer of a transfer film required to have no whole outer surface pattern fixture layer for imparting the unevenness to the decorative layer whereby a high design characteristic can be maintained.

Means to Solve the Problems

Means to solve a first problem of the invention is to provide a method for activating a print pattern of a transfer film formed by applying the print pattern on a water-soluble film with an activating agent and thereafter carrying out a water pressure transfer of said print pattern on a surface of an article, said method comprising the steps of preparing said transfer film having said print pattern including a first area of an ink layer and a second area of no ink layer or an ink layer thinner than that of said first area and having a whole outer surface exposed; forming activating agent convex collection portions by protruding on said surface of said article a surplus portion of said activating agent which is applied onto said surface of said transfer film to activate an ink of said first area while said surplus portion of said activating agent is collected in said second area by being pushed by said surface of said article on said water pressure transfer; and shrinking said activating agent convex collection portion when said print pattern on said article is hardened whereby a portion corresponding to said second area projects beyond an ink print portion corresponding to said first area to thereby impart a three-dimensional unevenness shape to said surface of said article surface, said activating agent of ultraviolet ray hardening resin composite to be applied to the surface of said transfer film having at least resin main component including first photo-polymerization monomer of three or more functional groups and second photo-polymerization monomer of two functional groups and photo-polymerization initiator, said first and second—polymerization monomers being blended so as to be a whole volume shrinkage ratio of 10 to 20% and a viscosity of 100 to 500 CPS.

In the means to solve the first problem of the invention, preferably, the first photo-polymerization monomer has the volume shrinkage ratio of 5 to 35% while said second photo-polymerization monomer has the volume shrinkage ratio of 10 to 22%, said first photo-polymerization monomer has molecular weight of 1500 or more while said second photo-polymerization monomer has molecular weight of 100 to 1000 and said first photo-polymerization monomer has a viscosity of 50 to 6000 CPS while said second photo-polymerization monomer has a viscosity of 3 to 30 CPS.

In the means to solve the first problem of the invention, in order to obtain the predetermined viscosity and ink solubility of the activating agent, the resin component of the activating agent preferably has the blend ratio of 20 to 70 weight % of the first photo-polymerization monomer of three or more functional groups and 30 to 80 weight % of the second photo-polymerization monomer of two functional groups.

Means to solve a second problem of the invention is to provide a water transfer article characterized by having a surface of three-dimensional unevenness formed by the water pressure transfer method according to the means to solve the first problem of the invention.

Means to solve a third problem of the invention is to provide an activating agent to be used for the water pressure transfer method according to the means to solve the first problem, said activating agent characterized by having at least resin main component including first photo-polymerization monomer of three or more functional groups and second photo-polymerization monomer of two functional groups and photo-polymerization initiator, said first and second—polymerization monomers being blended so as to be a whole volume shrinkage ratio of 10 to 20% and a viscosity of 100 to 500 CPS.

In the means to solve the third problem of the invention, preferably, the first photo-polymerization monomer has the volume shrinkage ratio of 5 to 35% while said second photo-polymerization monomer has the volume shrinkage ratio of 10 to 22%, said first photo-polymerization monomer has molecular weight of 1500 or more while said second photo-polymerization monomer has molecular weight of 100 to 1000 and said first photo-polymerization monomer has a viscosity of 50 to 6000 CPS while said second photo-polymerization monomer has a viscosity of 3 to 30 CPS.

In the means to solve the third problem of the invention, the resin component of the activating agent preferably has the blend ratio of 20 to 70 weight % of the first photo-polymerization monomer of three or more functional groups and 30 to 80 weight % of the second photo-polymerization monomer of two functional groups.

Effect of the Invention

In accordance with the invention, since the activating agent to activate the print pattern of the transfer film can obtain the high volume shrinkage ratio of 10 to 20%, which cannot be obtained for the ultraviolet ray hardening resin composite of conventional art, without using the photo-polymerization oligomer of low volume shrinkage ratio used in the ultraviolet ray hardening resin type activating agent of conventional art, there can be provided the extremely larger height difference of unevenness of the surface decorative layer and therefore the realer tactile feeling of unevenness can be obtained and the three-dimensional decoration can be more improved whereby the higher design can be maintained without any whole outer surface pattern fixture layer on the transfer film.

In the activating agent used for the invention, since the first photo-polymerization monomer of three or more functional groups imparts the mechanical and chemical surface protection function to the surface decorative layer in place of the photo-polymerization oligomer of the activating agent of conventional art, the membrane performance of the surface decoration layer can be maintained.

Furthermore, as the ultraviolet ray hardening resin type activating agent has the relatively lower viscosity of 100 to 500 CPS and in addition thereto preferably the high ink solubility of 7 and more at SP value, the easiness of coating the activating agent on the print pattern and the high permeability of the activating agent in the print pattern can be maintained to thereby ease the operation of activation and also to positively adhere the print pattern onto the article. The viscosity of the ultraviolet ray hardening resin type activating agent is higher than 10 to 100 CPS of the viscosity of the ultraviolet ray hardening resin type activating agent of the prior art disclosed in the Patent Document 4. The reason for this is that the activating agent easily permeates the ink and also the easy movement of the activating agent caused by the repelling function promotes the formation of the convex collection portions of the activating agent with the result that the function of the appearance of the unevenness design can be expected. However, it has been found that as the viscosity of the activating agent is made higher as long as the permeability of the activating agent into ink is maintained in order to enlarge the height difference of unevenness, the thicker coating can be easily accomplished in view of the relation of balance between interfacial tension and gravity. Thus, the invention defines the viscosity of the activating agent to the range of 100 to 500 CPS, which maintains the permeability of the activating agent into ink and improves the thicker coating thereof. In case where such a range of the viscosity of the activating agent is set, it can be controlled in consideration of the blend ratio of the first photo-polymerization monomer of three or more functional groups having the high viscosity and the second photo-polymerization monomer having the lower viscosity and the addition of other additives.

BRIEF DESCRIPTION OF THE DRAWINGS

FIG. 3 shows one form of the water pressure transfer method of the invention sequentially in order of steps of operation wherein FIG. 3A is a sectional view of a transfer film, FIG. 3B is a sectional view of the state where the activating agent was applied to the transfer film, FIG. 3C is a sectional view of the state where the convex portions caused by the surplus portion of the activating agent are formed on the surface of the article after the transfer process, FIG. 3D is a sectional view of the state where the ultraviolet rays are irradiated after the water pressure transfer process, FIG. 3E is a sectional view of the state where a water-soluble film was washed out from the article and FIG. 3F is a sectional view the state where the surface of the article is dried.

BEST MODE OF EXAMPLE OF INVENTION

Figure 1:
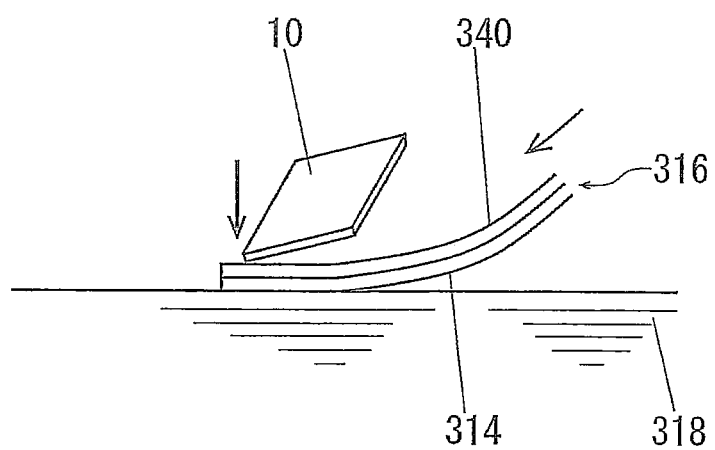
FIG. 1 is a schematic diagram showing the outline of a water pressure transfer method according to this invention.
Figure 2:
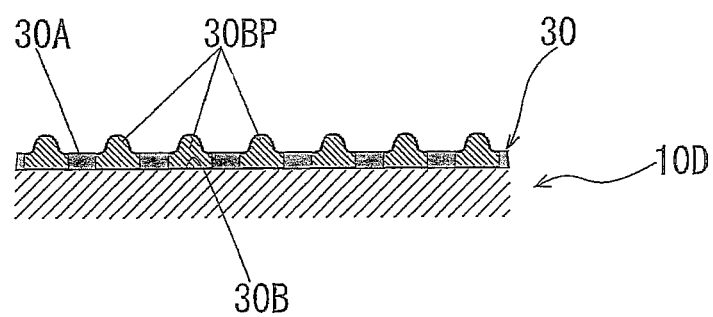
FIG. 2 is a partially enlarged sectional view of a water pressure transfer article obtained by the method of the invention.

Referring to a mode of embodiment of the invention in details with reference to the drawings, FIG. 1 briefly illustrates a water pressure transfer method to which this invention is applied. This water pressure transfer method is a method in which an activating agent 320 of ultraviolet ray hardening resin described in details later is applied to a print pattern 340 of a transfer film 316 (see FIG. 3(A)) comprising a water soluble film 314 having the print pattern 340 applied thereon to thereby activate the ink of the print pattern, thereafter the transfer film 316 is floated on a water 318 within a transfer tub not shown with the print pattern 340 directed upside and an article 10 to be transferred under water pressure is forced underwater through the transfer film 316 (see FIG. 1 and FIG. 3(B)) to thereby form a decorated article 10D having a print layer (or a decorative layer) 30 (see FIG. 2 and FIG. 3(C)) of a pattern corresponding to the print pattern 340 on the surface of the article 10. An ingredient of the ink of the print pattern 340 and materials of components such as the water-soluble film 314 and so on (excluding the activating agent) are not limited to what are described with respect to the mode of embodiment and Examples which are described later and the article 10 may have a suitable ground process applied thereto before the water pressure transfer is carried out.

The water soluble film 314 is formed of water soluble material having a main ingredient of polyvinyl alcohol, for example, which gets wet and is softened by absorbing water. This water soluble film 314 is softened when it contacts the water within the transfer tub to facilitate the water pressure transfer. The print pattern 312 may be applied on the water soluble film 314 by gravure printing and so on and the transfer film 316 may be stored in the state where the ink is dried and activated by using the activating agent when the water pressure transfer is carried out.

Figure 3:
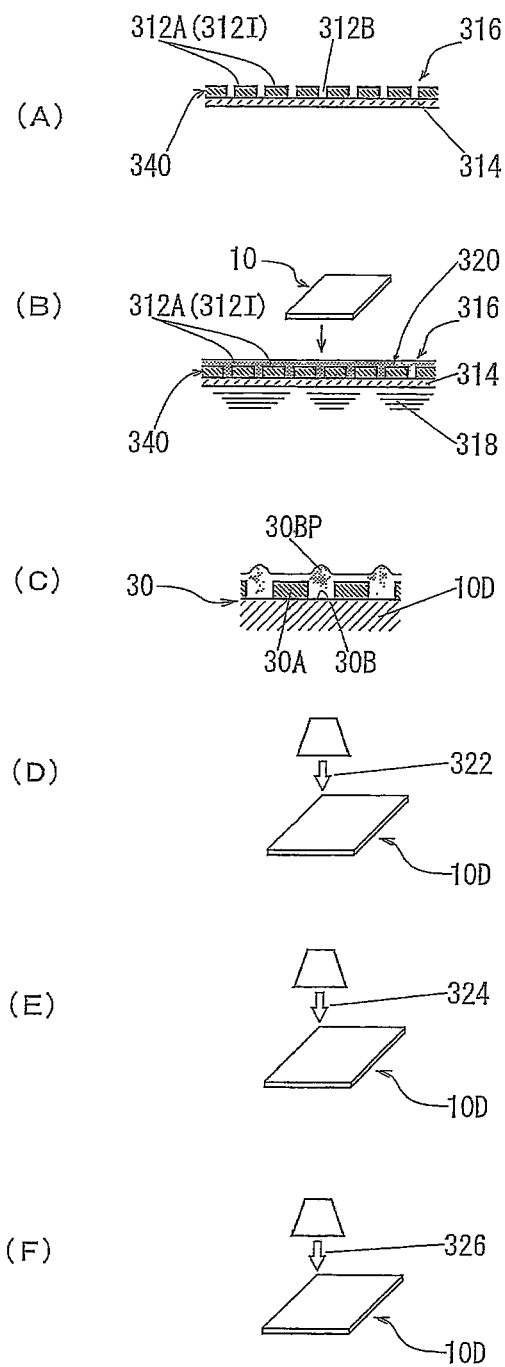

Thereafter, the decorated article 10D having the print layer 30 formed thereon passes through a curing step (see FIG. 3 (D)) where the activating agent is hardened, a shower washing step (see FIG. 3 (E)) where the water-soluble film 314 is removed and a drying step (see FIG. 3 (F)) where the surface of the article is dried and then a finished product can be produced.

Although not illustrated, in practice, the article 10 is forced underwater, while it is being conveyed by a suitable conveyor or being supported by a robot arm. In some cases, the step of applying the activating agent 320 on the print pattern 340 and the step of floating the transfer film 316 on the water may be performed in a reverse order where the activating agent 320 may be sprayed on the print pattern 340 of the transfer film 316 which is floated on the water.

The method of the invention lies in an application of the specific activating agent for the method disclosed in Japanese Patent Application No. 2007-277501 and PCT/JP2008/069304, both of which were previously filed by the applicant and the invention will be described in details together with the content of the prior applications.

Figure 4:
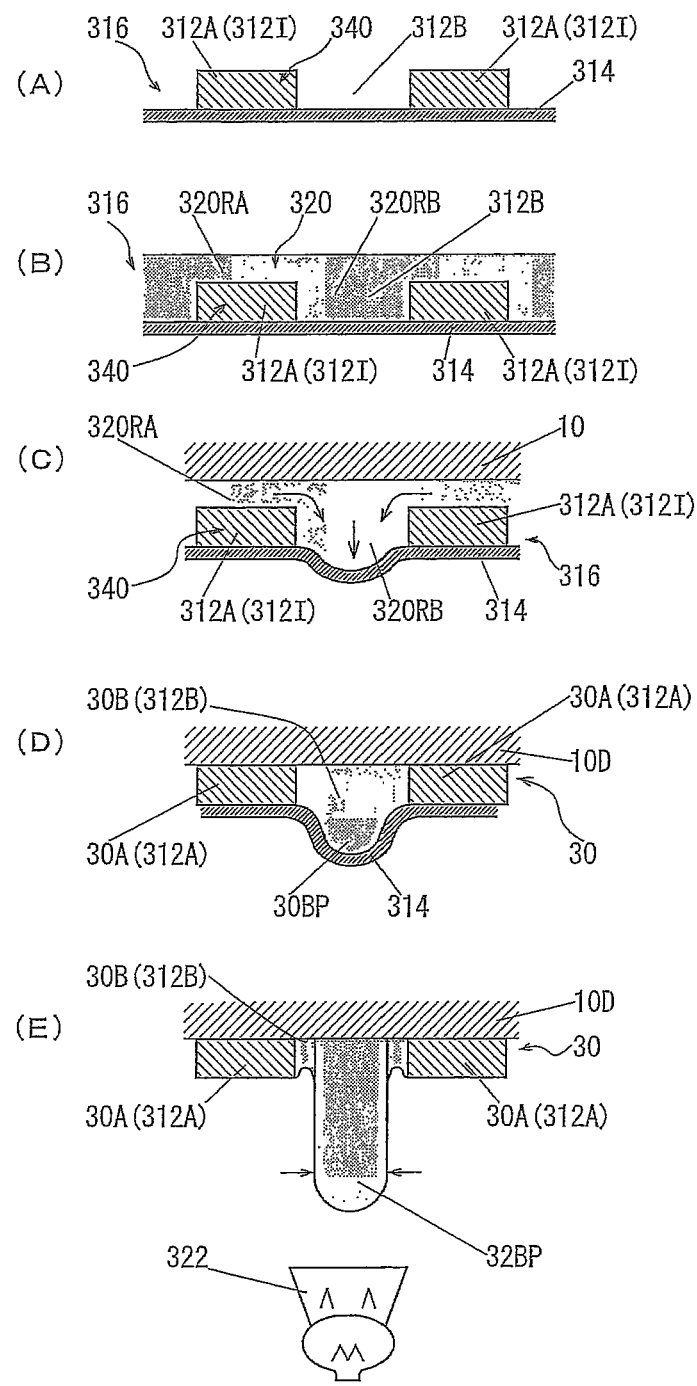
FIG. 4 is a schematic diagram illustrating the steps of the method according to the first form of the invention.

In the method of the invention, as shown in FIGS. 4 (A) and 6(A), there is used the transfer film 316 having the print pattern 340 comprising a first area 312A having an ink layer 3121 and a second area 312B having no ink layer or an ink layer thinner than the ink layer of the first area 312A, having a space required for collecting a surplus portion of the activating agent provided in the second area 312 and having no whole outer surface pattern fixture layer provided thereon. An interfacial tension of the first area 312A relative to the activating agent is preferably lower than an interfacial tension of the second area 312B relative to the activating agent, and the reason for it will be described later.

As the activating agent 320 of ultraviolet ray hardening resin is applied on the transfer film 316, this activating agent 320 activates the ink layer 3121 in the first area 312A of the print pattern 312 while it permeates this ink layer 3121 to restore the adhesion having the same state as the one when the ink layer is printed, which enables the water pressure transfer of the print pattern 312 to be performed. As described in details later, at the same time as the above activation, a surplus portion 320R of the activating agent 320 of ultraviolet ray hardening type resin used for activating the print pattern 312 is transferred to a space (a middle space) between the adjacent ink printed portions 30A of the print layer (the surface decoration layer) 30 (see FIG. 2) formed by the print pattern 340 of the transfer film 316 being transferred under water pressure while it is collected in the convex state so that convex portions 30BP higher than the ink printed portions 30A are formed in the middle spaces 30B to impart three-dimensional concavo-convex tactile feeling.

In this manner, there are two following forms in order to collect the surplus portion of the activating agent for activating the print pattern 340 of the transfer film 316 in the convex state between the adjacent ink printed portions 30A of the print layer 30 on the article to thereby form the convex portions 30BP. As described later in detail with reference to FIGS. 4 and 5, the first form is the one in which the surplus portion 320R of the activating agent applied on the transfer film 316 is transferred onto the surface of the article while it is collected between the ink printed portions 312A of the print pattern 340 on water pressure transfer so that the surplus portion 320R of the activating agent flows into the adjacent ink printed portions 312A to thereby form the convex portions 30BP. As described later in detail with reference to FIGS. 6 and 7, the second form is the one in which the surplus portion 320R of the activating agent is collected in the second area 312B by means of the repelling operation of the ink layer 3121 in the first area 312A of the print pattern 340 and the collecting power of the activating agent 320 and thereafter, the concavo-convex reversal of the activating agent convex collection portions 320C in the second area 312B is carried out on the surface of the article on water pressure transfer to thereby form the convex portions 30BP. What is meant by "repelling function" is the phenomena in which the surplus portions of the activating agent remaining on the ink is pulled from the surface of the location where there is the ink layer toward the location where there is no ink layer due to the difference of the polarity of the ink layer location and the no ink layer location as previously described. Thus, the "repelling function" may be also referred to as "pulling phenomena" due to the polarity difference between the two locations as viewed from the location where there is no ink layer. It should be noted that the activating agent is never prevented from permeating the ink layer for activating the ink due to the "repelling function" or the "pulling phenomena".

It will be considered that the process according to the first form and the process according to the second form are independently or simultaneously performed and each of the processes will be concretely described later. In either case, the activating agent is necessary to be applied at the amount of the surplus portion required to form the convex portions 32BP exceeding the amount for permeating the ink printed portions 312 to activate the ink.

Figure 5:
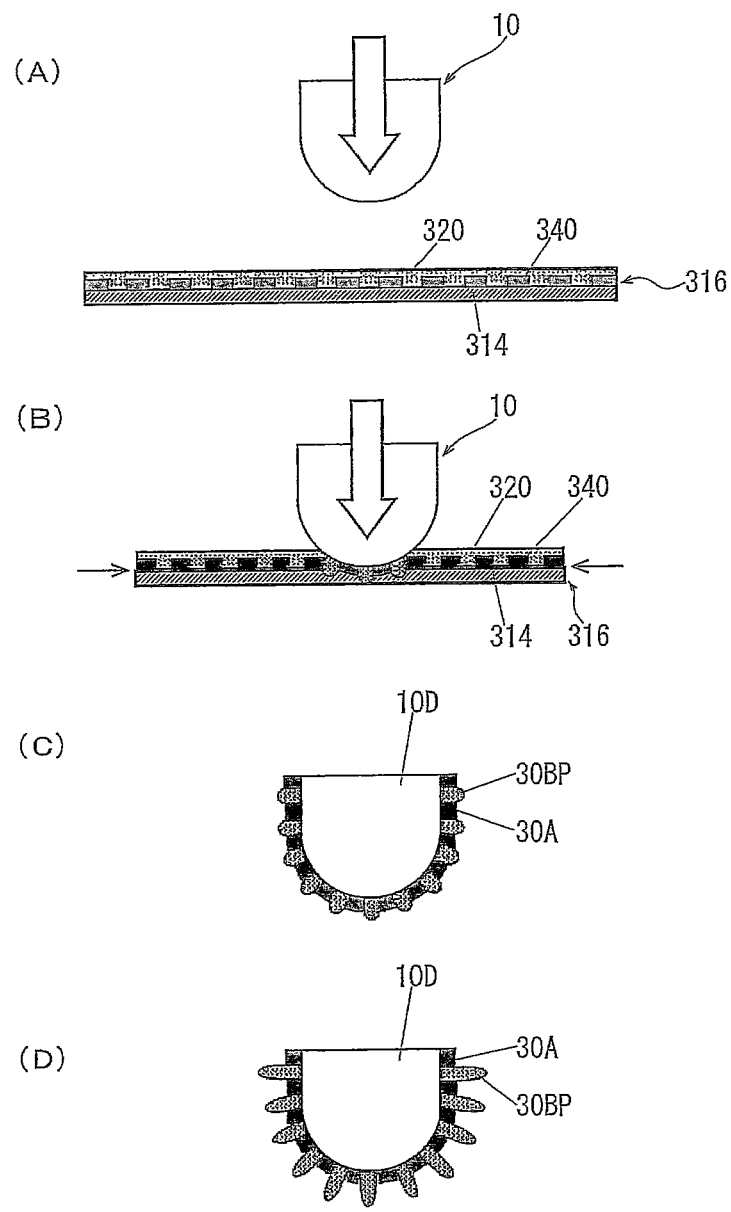
FIG. 5 is a schematically sectional view explaining the state where the transfer film is attached around the article according to the first form of the invention.

The process according to the first form is shown in FIGS. 4 and 5. As shown in FIG. 4 (B), as the activating agent 320 of ultraviolet ray hardening type resin is applied on the transfer film 316 shown in FIG. 4 (A), the activating agent 320 permeates the ink layer 3121 in the dried first area 312A of the print pattern 312 to restore the adhesion of the ink layer 3121. Therefore, as the article 10 is forced down underwater from above together with the transfer film 316, the print pattern 312 is transferred under water pressure so as to become the print layer (the surface decoration layer) 30 on the surface of the article 10 and at that time, the surplus portion 320RA of the activating agent 320 above the first area 312A and the surplus portion 320RB of the activating agent 320 in the second area 312B are collected while they are pushed down by the surface of the article 10 and flow into the second area 312B by their fluidity (see FIG. 4 (C)). Thus, these surplus portions of the activating agent 320 are transferred in the convex form into the space 30B (the portion corresponding to the second area 312B) between the adjacent ink printed portions 30A (the portions having the ink of the print layer 30) corresponding to the ink printed portions 3121 of the first area 312A to form the convex portion 30BP by the collection of the activating agent in the space 30B (see FIG. 4 (C)). This convex portion 30BP may have a more remarkable vertical height difference by providing a shrinkage difference at the time of ultraviolet ray hardening to form a crevice lower than the ink printed portions 30A surrounding the convex portion 30BP as described in detail with reference to FIG. 6 (F) relating to the second form.

The state where the article 10 is pushed underwater via the transfer film 316 is shown in FIG. 5 in detail. In this case, if a speed at which the transfer film 316 is attached around the article 10 is so set to be higher than a speed at which the surrounding surface of the article 10 is attached to the water, the height of the convex portion 30BP desirably becomes much more remarkable. The reason is the same as the reason for the second form later described with reference to FIG. 7. In FIGS. 1 and 4, the article 10 is shown to be conveniently flat, but in FIG. 5, the article 10 is shown in the form having the height and roundness in order to more easily explain the state where the transfer film 316 is attached around the article.

The activating agent 320 is formed of an ultraviolet ray hardening resin composite containing a photo-polymerization monomer which can give activation to the ink and in particular, preferably of a non-solvent type ultraviolet ray hardening resin composite. The activating agent 320 may be applied onto the transfer film 316 by either of a photogravure roll, a wire bar coating, or a spraying, for example. To the activating agent may be added a leveling agent, a sensitizer, filler, an inactivating organic polymer, a thixotropy imparting agent, a thermal polymerization prohibition agent, a delustering ingredient, etc. The convex portion 30BP formed in the space 30 is of the resinous component of the activating agent hardened by the ultraviolet ray.

Figure 6:
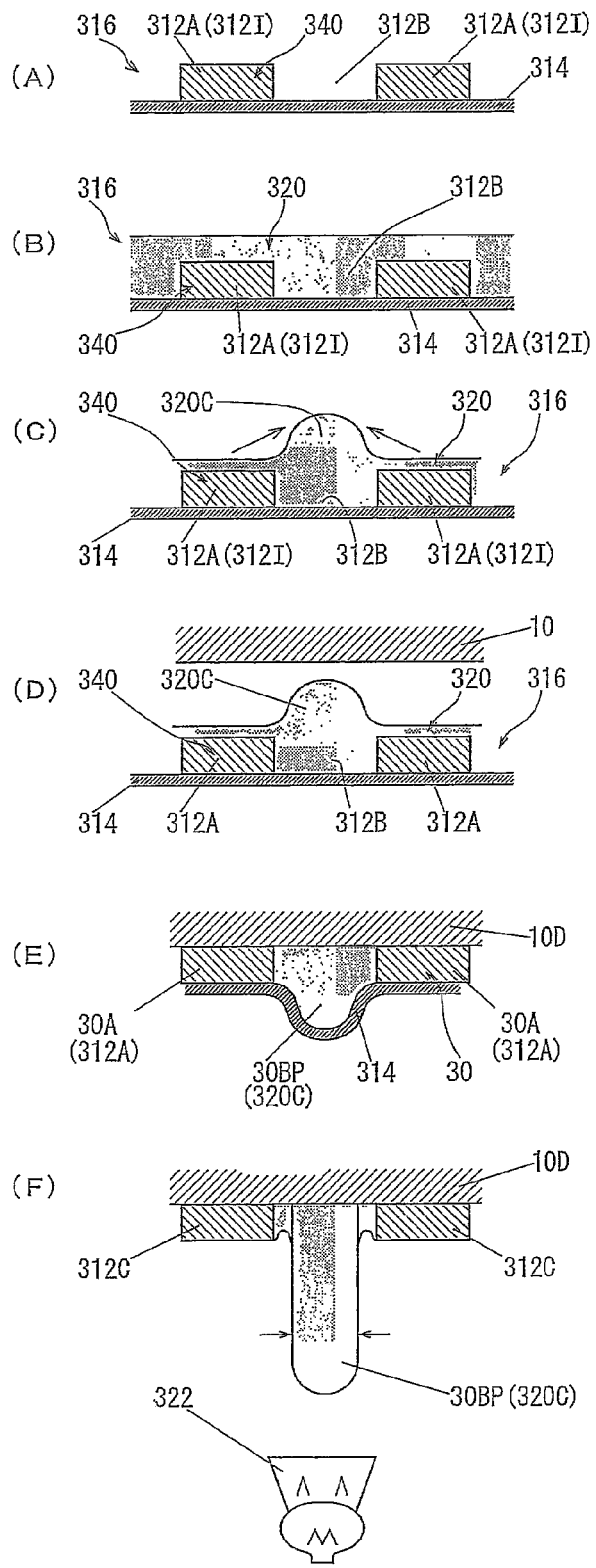
FIG. 6 is a schematic diagram illustrating the steps of the method according to the second form of the invention.
Figure 7:
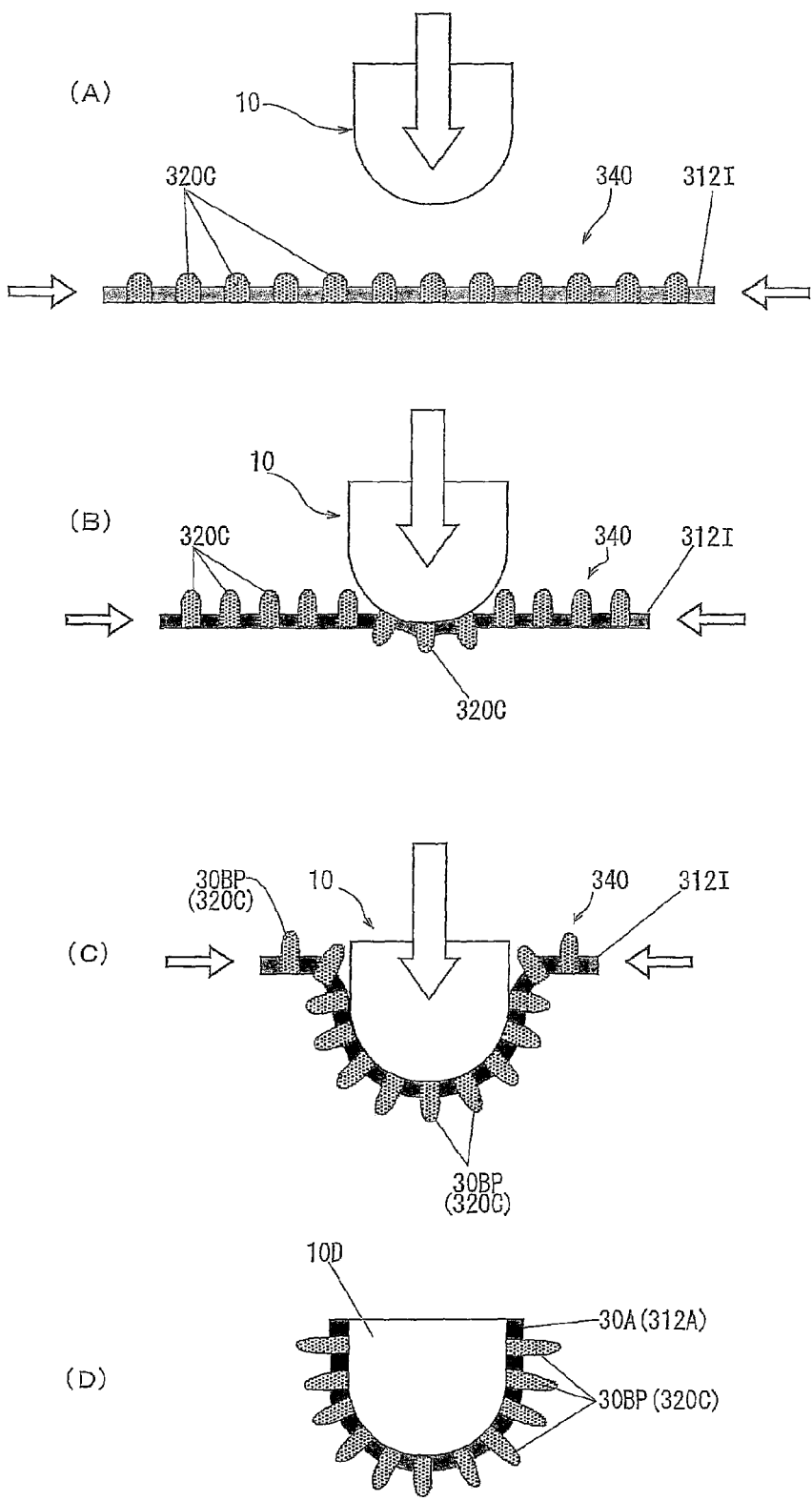
FIG. 7 is a schematically sectional view explaining the state where the transfer film is attached around the article according to the second form of the invention.
Figure 8:
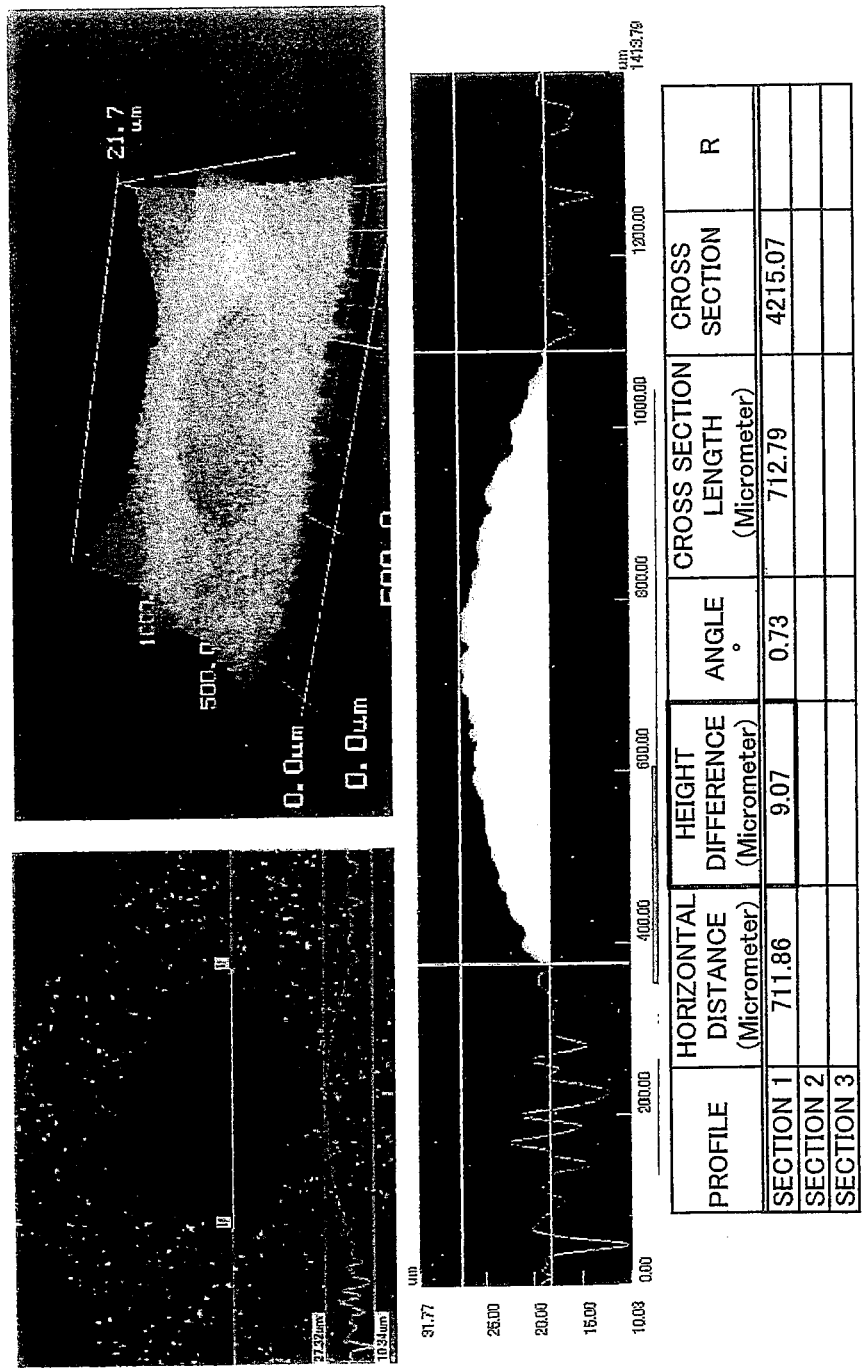
FIG. 8 is a photograph showing the surface of the real product obtained by the Example 1 of the invention and the section thereof in an enlarged manner.
Figure 9:
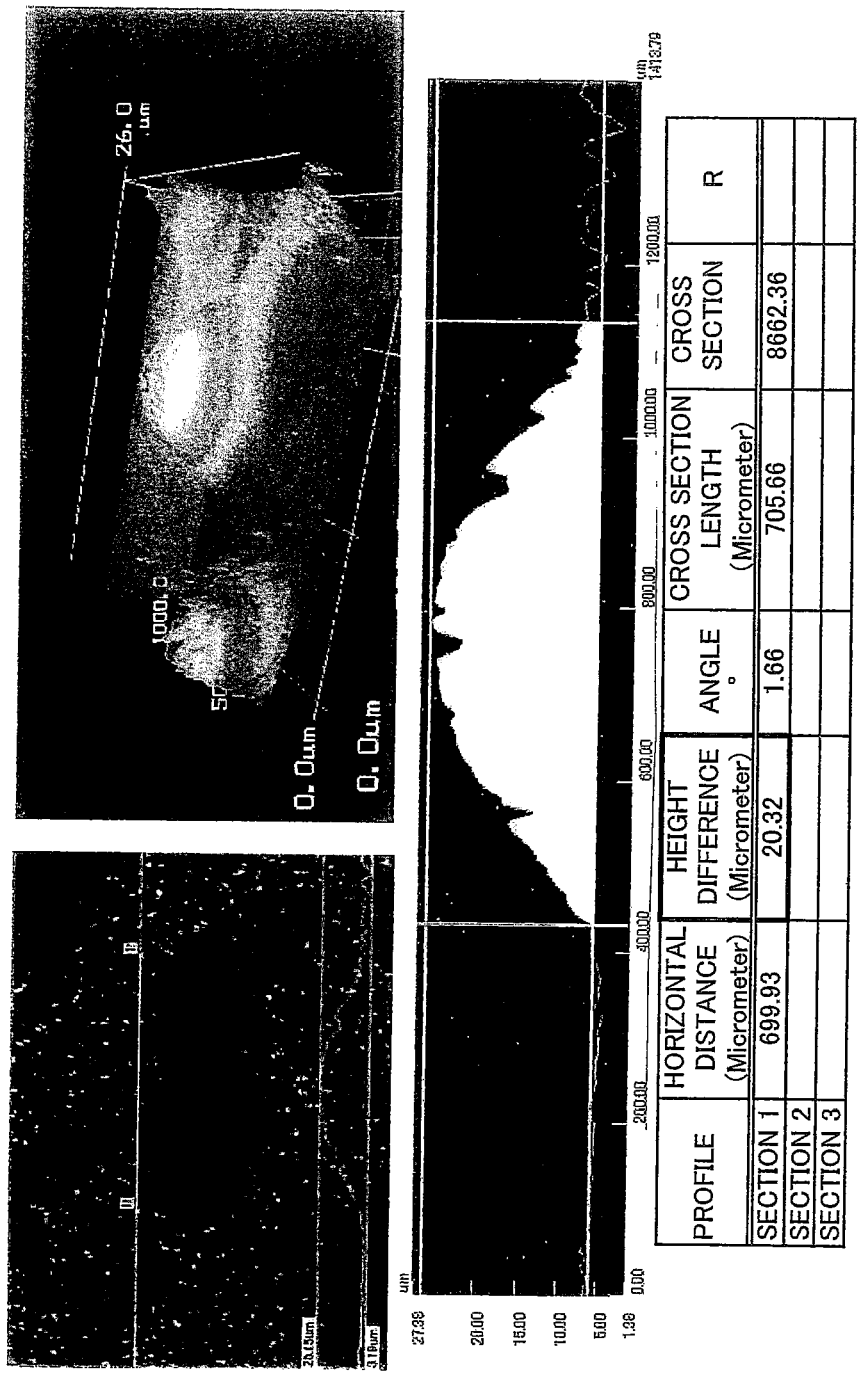
FIG. 9 is a photograph showing the surface of the real product obtained by the Example 2 of the invention and the section thereof in an enlarged manner.
Figure 10:
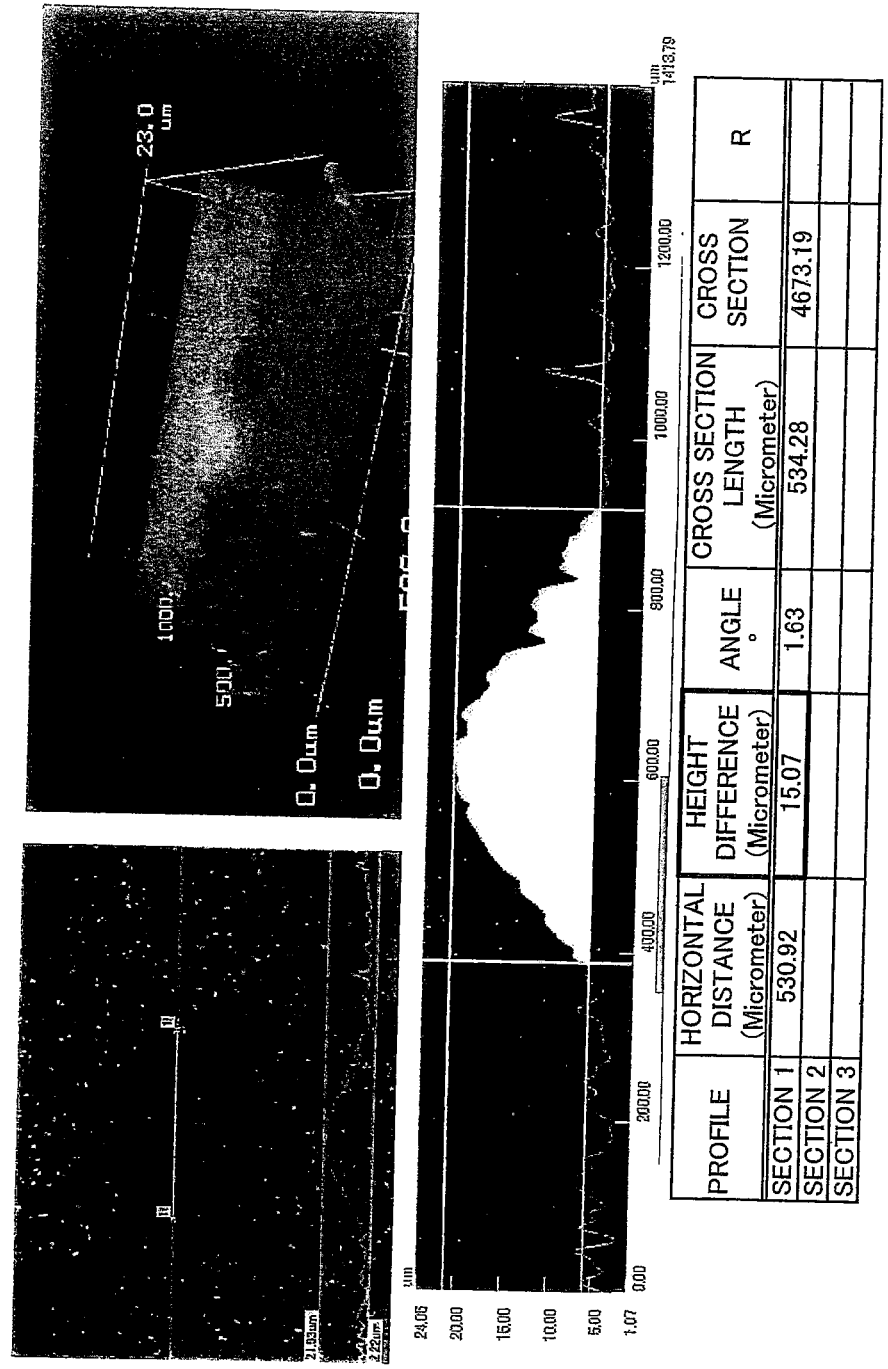
FIG. 10 is a photograph showing the surface of the real product obtained by the Example 4 of the invention and the section thereof in an enlarged manner.
Figure 11:
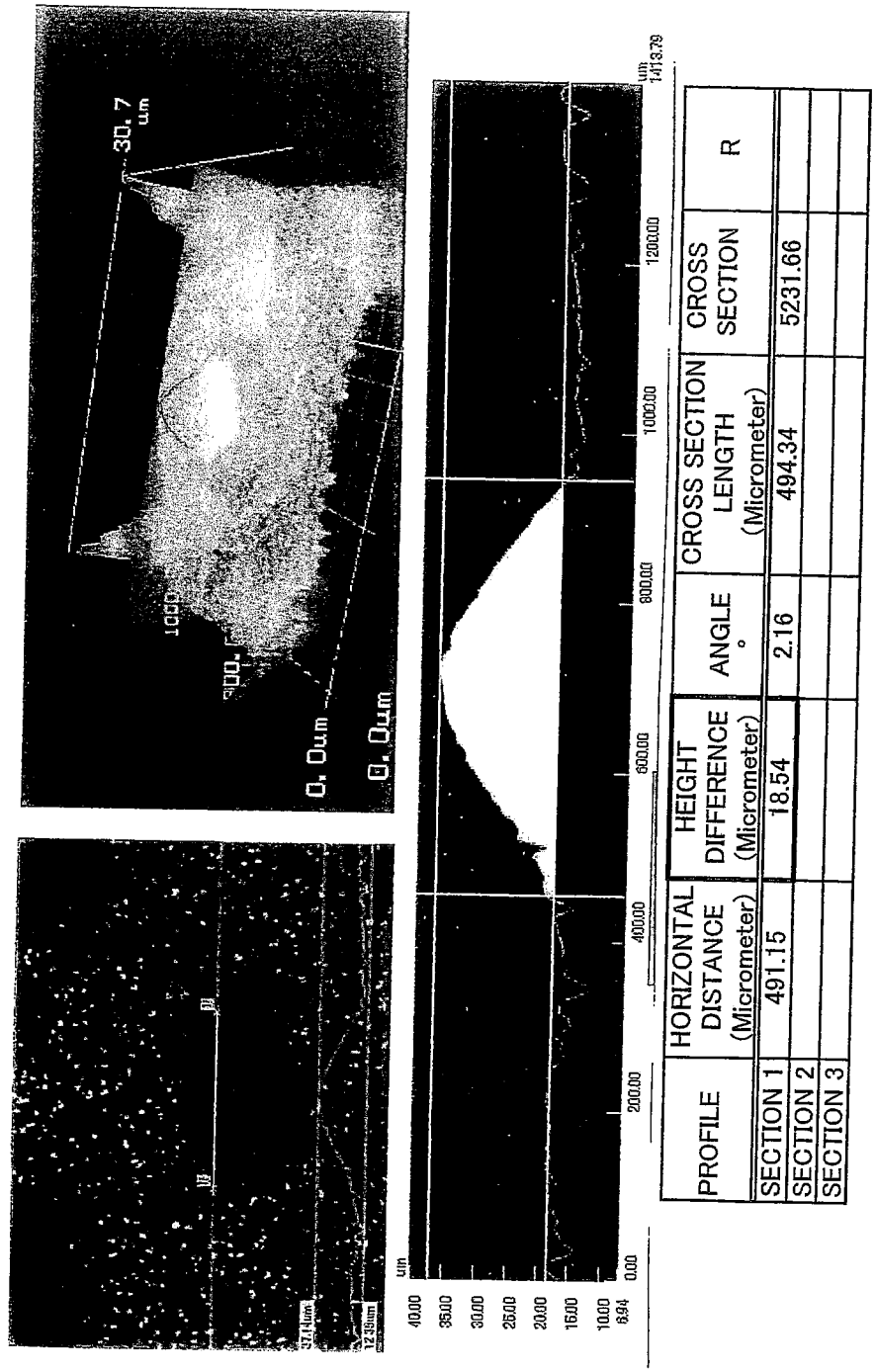
FIG. 11 is a photograph showing the surface of the real product obtained by the Example 5 of the invention and the section thereof in an enlarged manner.
Figure 12:
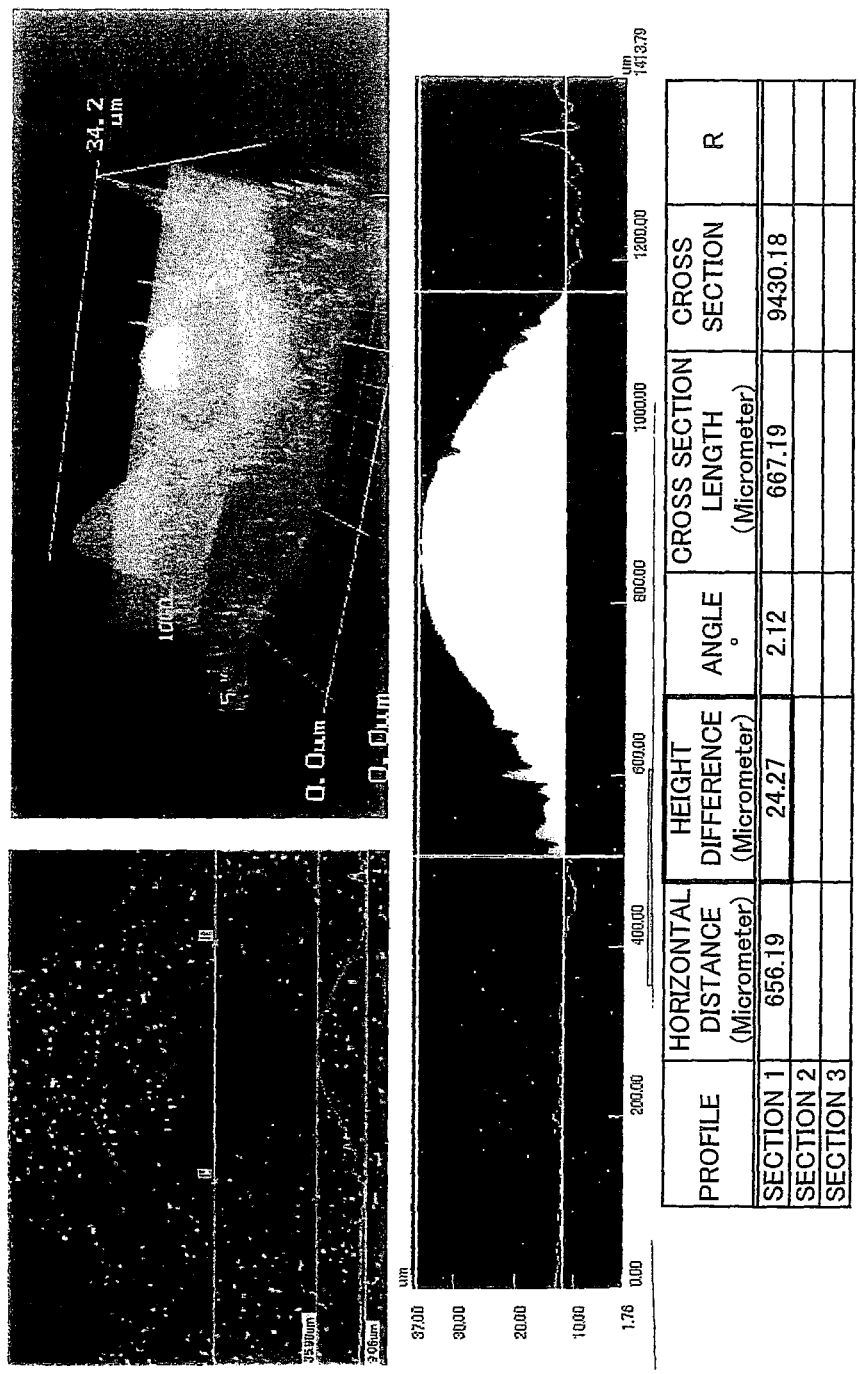
FIG. 12 is a photograph showing the surface of the real product obtained by the Example 6 of the invention and the section thereof in an enlarged manner.
Figure 13:
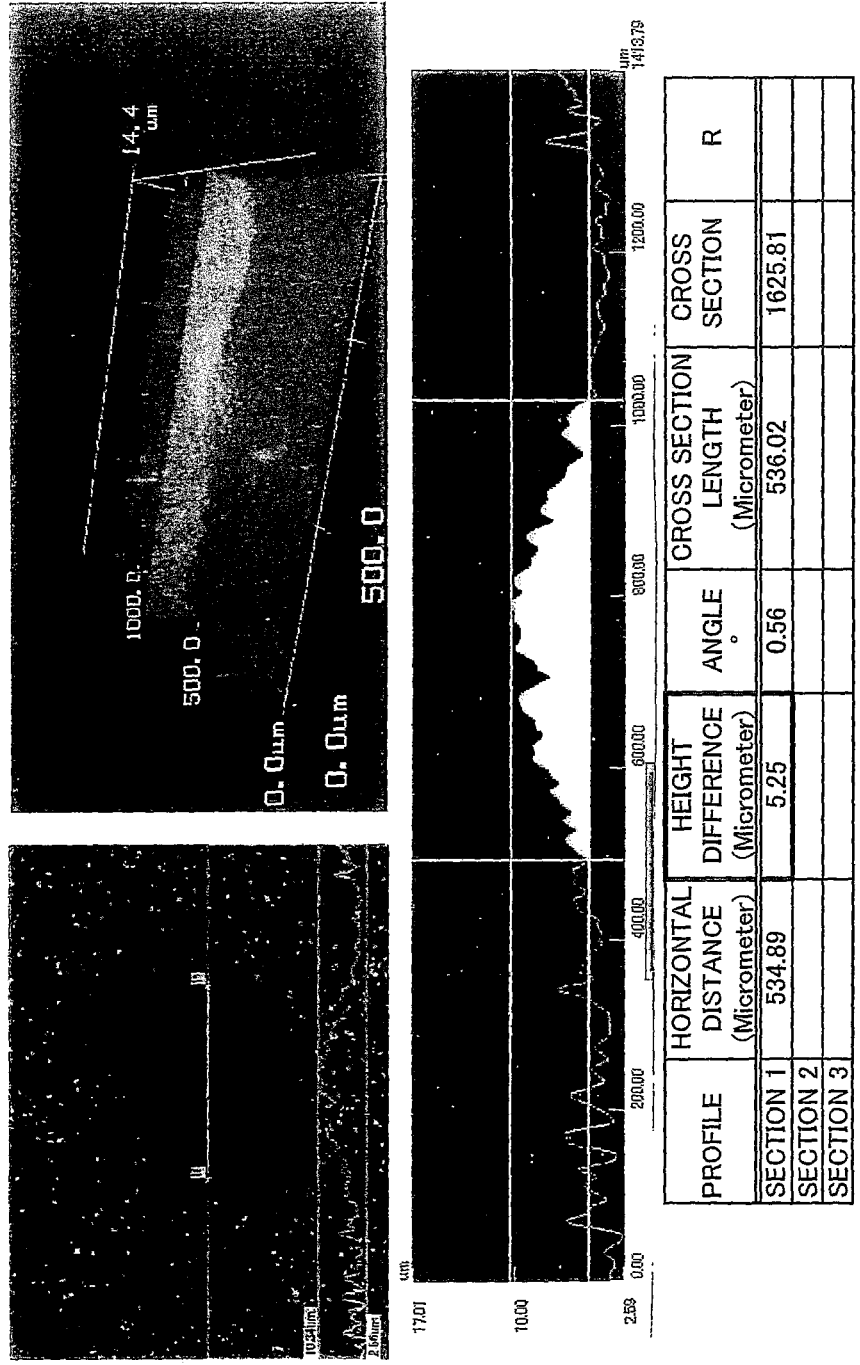
FIG. 13 is a photograph showing the surface of the real product obtained by the Comparison 1 and the section thereof in an enlarged manner.

The process of the second form is shown in FIGS. 6 and 7. As the activating agent 320 is applied to the transfer film 316 of FIG. 6(A) as shown in FIG. 6 (B), the activating agent 320 permeates the dried ink layer 3121 of the first area 312A of the print pattern 312 to recover the adhesion of the ink layer 3121, and meantime, as shown in FIG. 6 (C), the surplus portion 320R of the activating agent is transferred to the second area 312B while it is repelled by the low interfacial tension of the ink layer 3121 and the activating agent collects in the convex form in the second area 312B by the action of the collecting power of the activating agent itself in the second area 312B. Referring to FIG. 6 (C), it will be understood that the surplus portion of the activating agent 320 collects from the first area 312A having the ink layer 3121 to the second area 312 having no ink layer (or having the thinner ink layer) so that it rises slightly. The rising portion will be referred to as an activating agent convex collection portion 320C later. The height of this activating agent convex collection portion 320C is several micrometers.

Adjustment of the interfacial tension of the ink layer 3121 to the activating agent 320 may be performed by adjusting the leveling agent in the activating agent 320. As the leveling agent in the activating agent 320 increases, the interfacial tension of the ink layer 3121 of the first area 312A to the activating agent 320 can be lowered and the collecting power of the activating agent 320 to the second area 312B can be heightened. In case where the second area 312B has the ink layer thinner than the ink layer 3121 of the first area 312A, the thickness of the ink layer of this second area 3128 should be set up to such an extent that the concavo-convex reversal as described later is not prevented. For example, in case where the thinner ink layer is provided in the second area 312B by gravure printing, this thinner ink layer may be preferably provided in the form of very fine dot independent from each other and completely dissolved by the activating agent while it colors the activating agent, for example. Thus, as the material (the thinner ink layer or the activating agent) with which the second area 312B is filled up is colored, the skin color of the surface of the article recognized visually when not colored can be concealed, and an appearance of the print layer or decoration layer 30 of the surface of the article can be made better.

The leveling agent blended in the activating agent may be suitably adjusted according to an affinity with the composition of the ink of the print pattern 340. If the amount of the leveling agent is too small (there is no leveling property), then the permeability of the activating agent into the ink layer 3121 of the first area 312A is considerably reduced and therefore, sufficient permeation (activation) of the activating agent into the ink layer 3121 cannot be maintained. Furthermore, since the activating agent cannot be never wholly united or combined with ink component, there occurs a problem that the good adhesion of the ink cannot be recovered and also there cannot be expected the mechanically and chemically good property, which is obtained by the whole unity or combination of the activating agent with the ink component. Reversely, if the amount of the leveling agent is too many, the repelling operation by the ink gets lower, the collecting power of the activating agent is lowered, and as a result, the height of the activating agent convex collection portion 320C gets lower and the convex portion 30BP formed by the concavo-convex reversal disadvantageously has a tendency to be lowered by its leveling. Therefore, the leveling agent should be adjusted in the range where such a disadvantage never occurs. The desirable leveling agent may be a silicon system leveling agent such as an organic denaturation polysiloxane, an acrylic leveling agent such as polyacrylate or a UV coating leveling agent having a frame of dimethylpolysiloxane commercially available under the name of BYK-UV3500 (BYK is the registered trademark of BYK Chemie, Japan). These leveling agents may be preferably contained in the activating agent at the rate of 0.01 to 3 weight % relative to the total amount (weight) of the first photo-polymerization monomer and the second photo-polymerization monomer, and more preferably at the rate of 0.01 to 0.5 weight %. As the collecting power of the activating agent is heightened, the height of the activating agent convex collection portion 320C of the second area 312B has the tendency to become higher than the height of the first area, but this height differs on the characteristic of respective areas, i.e., the ingredients such as the solid content of the ink or the pigments, an interval of the areas, the amount of application of the activating agent, etc. For example, the collecting power of the activating agent may be preferably set to be high so that the second area 312B may become higher than the first area 312A by about 2-10 micrometers.

Also, the activating agent 320 used for the second form may preferably comprise the non-solvent type ultraviolet ray hardening resin composite having photo-polymerization monomer blended with a predetermined amount of the leveling agent. This activating agent may be also applied onto the transfer film 316 by either of the methods of the photogravure roll, the wire bar coating and the spraying. To this activating agent may be also added a leveling agent, a sensitizer, a filler, an inactivating organic polymer, a thixotropy imparting agent, a thermal polymerization prohibition agent, a delustering ingredient, etc. unless the repelling function (the pulling function) of the activating agent is reduced.

In order to heighten the interfacial tension to the activating agent 320 (in order to make better the wetting of the surface to be used as the second area of the water-soluble film), a surface treatment such as a surface improvement or the like by UV irradiation, for example, may be performed to the water-soluble film 314 before the print pattern is applied. With such a treatment performed, the collecting power of the activating agent 320 of the second area 312B can be further heightened.

In this manner, the print pattern 340 is transferred under water pressure onto the article 10 using the transfer film 316 having the activating agent convex collection portion 320C formed in the second area 312B by applying the print pattern activating agent 320, as shown in FIG. 6 (D) and at that time, the print pattern 340 of the transfer film 316 is transferred onto the surface of the article 10 while the concavo-convex reversal is carried out so that the activating agent convex collection portion 320C of the second area 312B may be pushed up toward the water-soluble film 314 of the transfer film 316 as shown in FIG. 6 (E). In other words, the activating agent convex collection portion 320C having the convex formed toward the opposite side to the water-soluble film 314 of the transfer film 316 is reversed by the water pressure transfer so that the portion having the convex until now is pushed as a reaction by the surface of the article 10 until the convex is formed toward the water soluble film 314 to thereby form the portion 30BP having the convex formed toward the decoration layer 30 (the layer formed by attachment of the print pattern 340). This concavo-convex reversal of the activating agent convex collection portion 320C can be accomplished by having the portion of no ink layer or of the thinner ink layer on the print pattern 30 and also by having no whole outer surface pattern fixture layer surrounding the whole outer surface of the print pattern 340.

The concavo-convex reversal of the activating agent convex collection portion 320C may be preferably performed by attaching the transfer film 316 around the surface of the article 10 so as to shrink the transfer film 316 in at least one of longitudinal and latitudinal directions. This attachment of the transfer film 316 around the surface of the article 10 due to its shrinkage can be performed so that the speed at which the transfer film is attached around the article is set to get higher than the speed at which the surrounding surface of the article is attached onto the water. In this manner, the protrusion of the portion 320C (the convex portion 30BP) can be made more remarkable.

Explaining this movement more concretely with reference to FIG. 7, as the print pattern 340 is transferred so as to move the print pattern 340 toward the article 10 along the longitudinal direction as shown in FIGS. 7(B) and 7(C) when the article 10 should be pushed against the print pattern 340 as shown in FIG. 7(A), the print pattern is transferred so as to be moved along the article 10 while a gap between the second area 312B and the first area 312A is being narrowed. Practically, since the first area 312A has the ink layer 312, but the second area 312B has no ink layer or the thinner ink layer, the width of the second area 312B is narrowed before the width of the first area 312A is narrowed. Thus, the surplus portion of the activating agent is collected so that the activating agent projects still more highly within the narrowed second area 312B (see FIG. 7(B)). In this manner, since the activating agent surplus portion in the state of projecting much more highly contacts the surface of the article 10 from above, when the concavo-convex reversal is carried out by being pushed by the surface of the article 10, the activating agent surplus portion has the more remarkable convex toward the water-soluble film 314 (see FIG. 7 (D)). In order to shrink the print pattern 340 so as to be brought near the article 10, in case of a batch type transfer tub, the article is immersed underwater while the water soluble film 314 made fully wet on the water within the transfer tub is brought near the point where the water soluble film lands on the water from both sides of the water soluble film or in case of a water pressure transfer using a running water type transfer tub where the water runs from upstream to downstream, the print pattern 340 can be narrowed so that the print pattern 340 on the water soluble film 314 is brought further near the article 10 while the relative speed of the article 10 and the water stream is so set that the article moves more slowly (so that the speed of the water stream gets higher).

After the step of the concavo-convex reversal of FIG. 6 (E), FIGS. 7 (C) and (D), the print layer or decoration layer 30 (the original print pattern 340) is hardened by UV ray irradiation using a UV ray irradiation hardening apparatus (see FIG. 3 (D) and FIG. 6(F)), thereafter as explained with reference to FIG. 3(E), the water soluble film 314 remaining on the surface of the article is removed by the shower washing machine 324 and finally the surface of the article 10 is dried by the drier 326 (an air blower, for example) to complete the decorated article 10D having the fine concavo-convex surface. In this invention, the step of hardening the decoration layer 30 (see FIG. 3(D)) and the step of removing the water-soluble film 314(see FIG. 3(E)) may be made reverse. Otherwise, the dryness of the surface of the article 10D may be naturally made.

Hardening of the decoration layer 30 should be preferably made so as to make it hardened from the surface of the decoration layer 30. In this manner, as shown in FIG. 6 (F), the decoration layer 30 begins to shrink while the surface of the convex portion 30BP of the decoration layer 30 is hardened from the top of the convex portion 30BP to the side thereof and the interior of the convex portion 30BP begins to gradually shrink so as to follow the surface hardening. Thus, a modification of the interior having the softness occurs and the convex shape may be tapered off upwardly by making the interior thinner, which improves a finger contact feeling of the article. Especially, as the speed of hardening is higher, the shrinkage of the convex portion 30BP becomes still larger and that the height (tapering off) increases and therefore the concavo-convex difference can be suitably set up also by adjusting the hardening speed (see FIGS. 5(D) and 7(D)).

The first area 312A having the ink layer 3121 can control its shrinkage by using the ink of more solid content or the pigments of higher concentration. Thus, a bigger shrinkage difference can be provided between the first area 312A and the second area 312B by controlling the shrinkage of the ink whereby the convex shape of the convex portion 30BP may be further tapered off.

The UV ray irradiation-hardening apparatus 322 for hardening the surface decoration layer 30 may be in the arbitrary forms containing a low-pressure or high-pressure mercury lamp or a light source lamp such as a metal halide lamp and an irradiation device (a lamp house).

The UV irradiation hardening apparatus 322 may be preferably adapted to harden the surface of the activating agent convex collection portion 320C (the convex portion 30BP) at a dash by the UV ray irradiation. In this manner, when the surface coat is formed at a dash, the shrinkage modification of the ink printed portion (the first surface portion) 30A corresponding to the first area 312A and the portion (the second surface portion) 30B corresponding to the second area 312B can be remarkably made. In other words, when hardening of the activating agent convex collection portion 320C is carried out at a dash in this way to raise the shrinkage modification, "pulling" occurs from both of the first surface portion 30A and the second surface portion 30B simultaneously on their boundary line of the first surface portion 30A and the second surface portion 30B. Thus, the convex portion 30BP can be further heightened because there is formed the crevice having a low height difference shown in FIG. 6(F) on the side of the convex portion 30BP (which is lower than the ink printed portion of the decoration layer 30 or the first surface portion 30A) and the resin at the "pulling" is modified and transferred to the convex portion 30BP of the second surface portion 30B while the amount of the resin decreased by the crevice is shifted to the convex portion whereby much more remarkable concave-convex unevenness can be formed. The convex collecting portions of the activating agent of ultraviolet ray hardening resin composite (which may be either of solvent including type and solvent excluding type) is also hardened by ultraviolet ray when the major portion permeating the print pattern is hardened by ultraviolet ray, but since the ultraviolet ray hardening can be carried out in the state where the convex portion 30BP is covered with the water-soluble film 314 without contacting an air by washing and removing the surface water-soluble film after the surface hardening with the result that the surface hardening can speed up further to thereby make the concavo-convex difference much more remarkable.

In this invention, no provision of a surface protection layer (a top coat layer) may be preferably made because such a surface protection layer damages the cubic effect caused by the unevenness of the decoration layer 30, but if the surface protection layer having an imitated unevenness of the decoration layer 30, it will not necessarily deny providing the surface protection layer.

The activating agent of ultraviolet ray hardening resin for being suitably used for the invention has at least resin main component including a first photo-polymerization monomer A of three or more functional groups and a second photo-polymerization monomer B of two functional groups and a photo-polymerization initiator and the first and second photo-polymerization monomers A and B are blended so as to be a whole volume shrinkage ratio of 10 to 20% including additives and a viscosity of 100 to 500 CPS. If the whole volume shrinkage ratio does not reach 10%, then the desirable unevenness cannot be formed, and reversely, if the whole volume shrinkage ratio exceeds 20%, the desirable unevenness can be formed, but the membrane performance of the print pattern itself is reduced due to the too high volume shrinkage. Thus, the optimal whole volume shrinkage ratio is 10 to 20%. In order to make the solubility of the activating agent closer to that of the ink component of the print pattern, the first and second photo-polymerization monomers A and B may be preferably blended so as to get the ink solubility of 7 or more at SP value.

In this manner, the activating agent of ultraviolet ray hardening resin to be used for the invention avoids the use of a photo-polymerization oligomer (pre-polymer) of low volume shrinkage ratio so as to be able to heighten the volume shrinkage ratio of the activating agent and has the blend ratio of the first and second photo-polymerization monomers set to an appropriate value whereby the predetermined viscosity and ink solubility are obtained for maintaining the permeability of the activating agent into the ink, the transfer and the adhesion to the surface of the article 10 while maintaining the membrane performance, which is taken charge of by the photo-polymerization oligomer (pre-polymer) of the prior art activating agent.

In the invention, the first photo-polymerization monomer A of three or more functional groups has a main role of adjusting the volume shrinkage ratio of the whole activating agent and improving the membrane performance while the second photo-polymerization monomer B of two or more functional group has a role of adjusting (lowering) the viscosity of the activating agent within a range desirable for the coating operation efficiency while obtaining the height difference of concave-convex unevenness by means of the volume shrinkage ratio and further a role of maintaining the ink solubility and the desirable adhesion and coating operation efficiency.

In case where the first photo-polymerization monomer A (of three or more functional groups) and the second photo-polymerization monomer B (of two functional groups) of the activating agent, which will be described herein below are used, the resin component of the activating agent can be obtained by the blend ratio of 20 to 60 weight % of the first photo-polymerization monomer of three or more functional groups and 40 to 80 weight % of the second photo-polymerization monomer of two functional groups in order to obtain the aforementioned predetermined viscosity and ink solubility. If the blend amount of the second photo-polymerization monomer B is too high, the coating operation efficiency will be improved because the shrinkage when the activating agent is hardened and also the smoothness (leveling property) is strengthened, but due to the smoothness too strong superfluously, it is difficult to obtain the desirable height of concave-convex unevenness, and also there occur a poor shrinkage before hardened and a lower membrane performance. Thus, there is required to be balanced the coating operation efficiency, the height of concave-convex unevenness, the shrinkage before hardened and the membrane performance. Since the selected components of the first and second photo-polymerization monomers A and B have the viscosity and SP value changed in accordance with the composition such as the molecular weight, the blend ratio of the first and second photo-polymerization monomers A and B is not necessarily limited to the above-mentioned range. The activating agent is required to have the viscosity of 100-500 CPS and is more preferably set to have the ink solubility of 7 or more at SP value. The reason why the preferable range of SP value of the activating agent of the invention is set at "7 or more, which has the lower limit lower than ten or more of the prior art activating agent (Patent Document 4) is based on the knowledge that the ink solubility practically satisfactory even with the range of 7 to less than 10 of the SP value can be obtained according to the affinity of the ink composite of the print pattern and the activating agent and so on.

Figure 15:
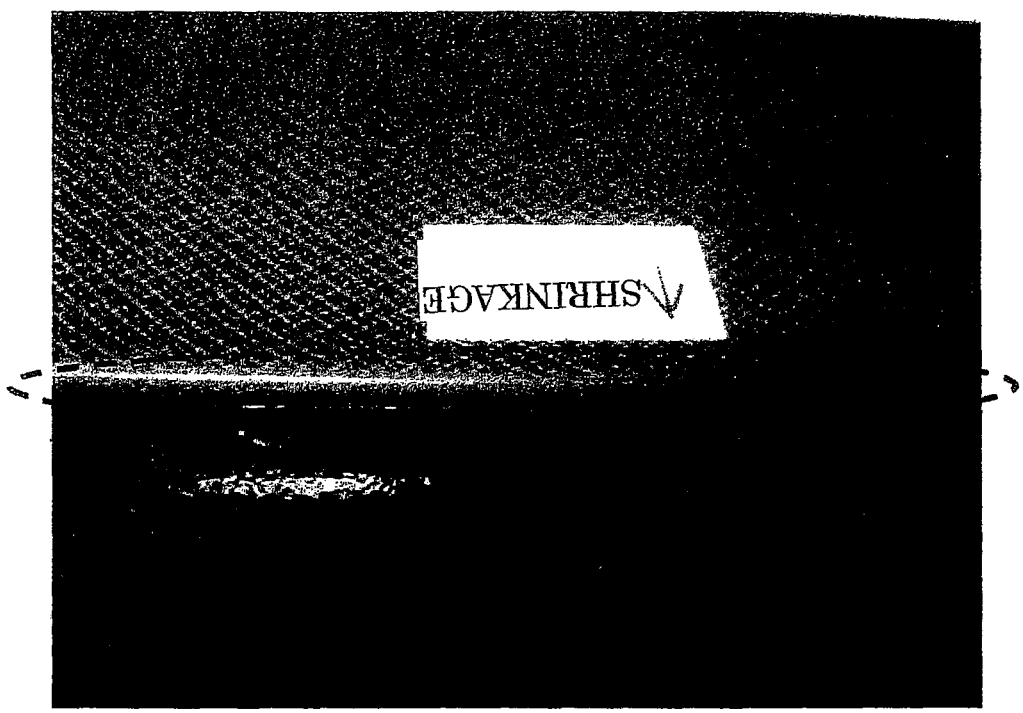
FIG. 15 is a photograph showing the print pattern in the state of poor shrinkage thereof before hardened.

What is meant by the afore-mentioned "poor shrinkage before hardened" is a defect which occurs when the smoothness is too strong and concretely, the phenomena in which a poor design such as a pattern shift in early stage after transferred caused by the adhesion of the design being not able to be maintained at the location (a corner or ends of the article) of a high curvature on the surface of the article because materials excessively swell due to the permeability of the activating agent before hardened by ultraviolet ray and the resultant strong action of interfacial tension to thereby excessively increase the flexibility of the activating agent. There is shown the state of poor shrinkage in FIG. 15. The shift of the pattern appears as "shrinkage" or "cutting" in design because stress tends to be concentrated at the location of high curvature on the surface of the article and accordingly unnecessary stress tends to be applied to the ink before hardened and the formed concave-convex unevenness. Thus, it is important to selectively adjust the first and second photo-polymerization monomers A and B not only so that the desired membrane performance and the coating operation efficiency can be mentioned "poor shrinkage before hardened", non-reactive resin may be added to the activating agent. The non-reactive resin may be acrylic polymer, for example. The desirable addition amount of the non-reactive resin is 2 to 30 weight % (as solid content) relative to the ultraviolet ray hardening resin composite (total weight of the first and second photo-polymerization monomers and the photo-polymerization initiator). If the addition amount of the non-reactive resin exceeds 30 weight %, there undesirably occurs gelling of the ultraviolet ray hardening resin. Although the molecular weight of the non-reactive resin can be suitably chosen within the range in which various characteristics of the ultraviolet ray hardening resin composite of the present invention are not damaged, but it is desirably 50000-100000 and more preferably 60000-80000.

The first photo-polymerization monomer A (photo-polymerization monomer of three or more functional groups) may be preferably the component having the volume shrinkage ratio of 5 to 35%, the molecular weight of 1500 or more and the viscosity of 50-6000 CPS and more preferably the component having the ink solubility of SP value of 7 or more in addition thereto.

The reason why the molecular weight of the first photo-polymerization monomer A is 1500 or more is that if it is less than 1500, then the membrane performance of the print layer (the surface decorative layer) cannot be fully maintained.

The reason why the volume shrinkage ratio of the first photo-polymerization monomer A is 5 to 35% is that if the volume shrinkage ratio is less than 5%, then the height difference of the concavo-convex unevenness of the activating agent convex-collecting portions 320C and the portions around them cannot be enlarged and in addition thereto it is difficult to adjust the height difference of the concave-convex unevenness, while if the volume shrinkage ratio exceeds 35%, then the volume shrinkage ratio is too high and therefore the adhesion of the membrane of the print layer or the surface decorative layer 30 obtained through the hardening step after transferred to the article tends to be reduced and the surface protection function will be possibly reduced. Thus, the volume shrinkage ratio of the first photo-polymerization monomer A is preferably 5 to 35%.

The reason why the viscosity of the first photo-polymerization monomer A is 50 to 6000 CPS and the ink solubility thereof is of SP value of 7 or more is that the viscosity and the ink solubility within such a range cause the coating operation and the permeation of the activating agent to be easily accomplished.

A concrete example of the first photo-polymerization monomer of such component may be listed as follows. One or a combination of two or more of the components may be used.
(1) Three Functional-Group Monomer Such monomer has the volume shrinkage ratio of 15.1 to 28 and the viscosity (mPa-s)/25° C. of 60 to 1100 and is listed for example, as follows. Pentaerythritol triacrylate, Trimethylol propane triacrylate, Trymethylol propane ethoxyacrylate, Polyether triacrylate, Glycerin proxytriacrylate and Tris (2-Hydroxyethyl) Iso Cyanurate Triacrylate
(2) Four or More Functional Group Monomer Such monomer has the volume shrinkage ratio of 7 to 33 and the viscosity (mPa-s)/25° C. of 160 to 5250 and is listed for example, as follows. Dipentaerythritol hexaacrylate, Pentaerythritol Tetraacrylate, Pentaerythritol ethoxytetraacrylate, Ditrimethyrol propane tetraacrylate and Dipentaerythritol pentaacrylate.

The second photo-polymerization monomer B (photo-polymerization monomer of two functional groups) may be desirably a component having the volume shrinkage ratio of 10 to 22%, the molecular weight of 100 to 1000 and the viscosity of 3 to 30 CPS and it may more desirably have the ink solubility of 7 or more at SP values.

The reason why the volume shrinkage ratio of the second photo-polymerization monomer is 10 to 22% is that if the volume shrinkage ratio of this monomer is less than 10%, then the viscosity of the activating agent gets too high whereby the concavo-convex reversal of the activating agent of the activating agent convex collecting portions 320C possibly becomes difficult and also the transfer operation efficiency becomes remarkably worsened and if the volume shrinkage ratio of the monomer exceeds 22%, the smoothness of the print layer or the surface decorative layer gets so strong that it is difficult to obtain the large height difference of the unevenness and also the print layer and the surface decorative layer 30 is excessively hardened and shrunk whereby the remaining stress reduces the membrane performance. The volume shrinkage ratio of the second photo-polymerization monomer B of 10 to 22% can avoid such disadvantages and also adjust the high viscosity of the first photo-polymerization monomer A whereby the viscosity of the whole activating agent can be adjusted to the predetermined value and the height difference of the concavo-convex unevenness can be set at the predetermined value.

The reason why that the molecular weight of the second photo-polymerization monomer B is defined to be 100 to 1000 is that this molecular weight improves the solvent power of the second photo-polymerization monomer B into the first photo-polymerization monomer A and the solvent power of the activating agent into the ink of the print pattern 320 to maintain the preparation of the activating agent and also the permeability of the activating agent into the print pattern, improves the ultraviolet ray hardening and the adhesion of the print pattern to the base material of the article 10 to be pattern transferred under water pressure, especially to ABS resin or PC resin as the base material of the article to thereby improve the adhesion intensity of the print layer or the surface decorative layer.

Moreover, the reason why the viscosity of the second photo-polymerization monomer B is defined to be 3 to 30 CPS and the ink solubility thereof is defined to be 7 or more at SP value is that the activating agent can be adjusted so that there can be obtained the predetermined viscosity of 100 to 500 CPS and the predetermined ink solubility of 7 or more at SP value by blending the thus defined second photo-polymerization monomer B with the first photo-polymerization monomer A.

The second photo-polymerization monomer B of such component may have the volume shrinkage ratio of 7.1 to 22 and the viscosity (mPa-s)/25° C. of 65 to 1400 and a concrete example is listed for example as follows. One or a combination of two or more of the components may be used.
Zypro pyrene glycol diacrylate, 1.6-hexanediol diacrylate, Tripropyrene glycol diacrylate, PEG600 diacrylate, PO denaturation neopentyl glycol diacrylate, Denaturation bisphenol A diacrylate, Ethoxylated bisphenol A diacrylate, Tricyclodecane dimethanol dimethacrylate, PEG400 diacrylate, Tetraethylene glycol diacrylate, Triethylene glycol diacrylate and polyethylene glycol diacrylate On condition that the volume shrinkage ratio of the activating agent is within the predetermined range and the blend ratio of the first and second photo-polymerization monomers is within the predetermined range, a part of the first photo-polymerization monomer may be selectively replaced by photo-polymerization oligomers such as urethane (meta) acrylate, Bisphenol A epoxy acrylate and Amine denaturation polyether acrylate. In this case, even though the height difference of the design unevenness is slightly lowered, there can be obtained the unevenness better than the case where the prior art activating agent is used and also there can be strengthened the membrane performance such as oleic acid residence permeability.

The photo-polymerization initiator serves to start the photo-polymerization reaction of the first and second photo-polymerization monomers and may preferably include both of the surface hardening type photo-polymerization initiator and the interior hardening type photo-polymerization initiator. A hydroxyl-ketone system, for example, may be used for the surface-hardening type photo-polymerization initiator and an acyl-phosphine oxide system, for example, may be used for the interior-hardening type photo-polymerization initiator.

As already stated, the ultraviolet ray hardening resin activating agent is applied or coated on the print pattern 30 beyond the quantity of the activating agent necessary for permeating the print pattern 340 of the transfer film 316 so as to activate the ink whereby the surplus thereof can be transferred onto the second area. The proper quantity of application is set to get 3 to 30 micrometers in the thickness, but more desirably it is set to get 10 to 25 micrometers in the thickness.

The term "non-solvent type" in the non-solvent type ultraviolet ray hardening resin composite used by this invention does not mean that there is absolutely zero of a "solvent ingredient", but is never exclusive of one having solvent ingredient added as auxiliary ingredient within the range where the action of the invention is never damaged, intentionally added in order to escape from the invention or having solvent ingredient added to the ultraviolet ray hardening resin used for dispersing additive components of hard dispersion or used for producing the photo-polymerization monomer, but remained. Similarly, the term "non-solvent type" does not mean that there is absolutely zero of "volatility" of the photo-polymerization monomer, but means that it is not as high as the solvent and therefore it may have the volatility in such a degree as can be disregarded practically. Furthermore, it should be understood that such a solvent should be used having the characteristics (solution intensity) and the amount of addition never damaging the activation of the print pattern by the photo-polymerization monomer of the ultraviolet ray hardening resin composite which is the main ingredient of the activating agent. A fundamental difference between the solvent type activating agent and the non-solvent type activating ingredient of the ultraviolet ray hardening resin is that in the former activating agent, the plasticity state of the ink by the recovery of the adhesion of the ink varies as time passes because the solvent ingredient of the solvent type activating agent volatilizes after the activating agent is coated, but in the latter activating agent (the activating agent ingredient of the invention), the plasticity state of the ink never varies because the adhesion of the ink is recovered by the photo-polymerization monomer ingredient (mainly the second photo-polymerization monomer) of little volatility. The activating agent of the invention never damages the plasticity state of the ink even though the solvent is included together in the range meeting the afore-mentioned condition so long as the blend ratio of the photo-polymerization monomers is within the specific range. In this manner, the amount of addition of the solvent for dispersing the non-reactive resins is preferably 5 to 50 weight % relative to the ultraviolet ray hardening resin composite (total amount of the first and second photo-polymerization monomers and the photo-polymerization initiator), more preferably 5 to 30 weight % and further preferably 5 to 20 weight %.

(Definition of SP Value)

The afore-mentioned "SP value" is the abbreviation of Solubility Parameter as described in Patent Documents 4. It is based on the turbidimetric titration method announced by Soe (K W. SUE) and Clark (D. H. CLARKE) and the turbidimetric titration method has been described in "Journal of Polymer Science PARTA-1 and Vol. 5-1671-1681 (1967).

EXAMPLES

Eight EXAMPLEs will be explained in details while comparing with two Comparisons.

EXAMPLEs 1 through 8 and COMPARISONs 1 and 2 were carried out while the compositions of the respective activating agent change in the following manner.

Figure 14:
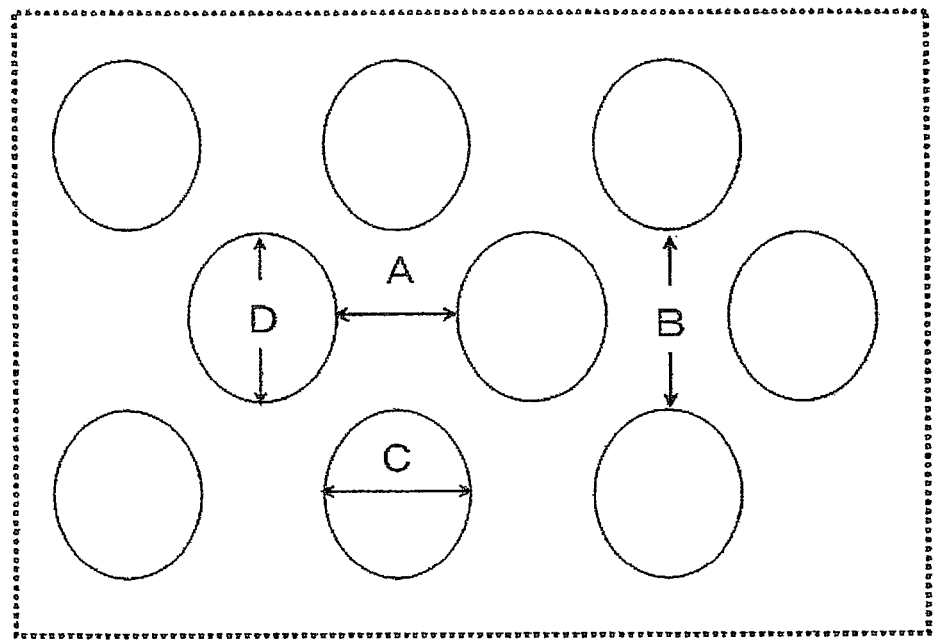
FIG. 14 is a figure showing the print pattern of the transfer film used for the Examples 1 through 6 and the Comparison 1 in an enlarged manner together with the sizes thereof.

(1) As shown in FIG. 14, the transfer film had the print pattern comprising the print pattern portion (the first area) studded with the dots of ellipse form and the portion (the second area) having no print pattern between the dots and has been commercially sold by TAICA CORPORATION to the licensee of the water pressure transfer art under the brand name called "STAR BACK SI", but the whole outer surface pattern fixture layer or the whole surface ink layer was removed therefrom. Concretely explaining the transfer film called "STAR BACK SI", as shown in FIG. 14, the print pattern of pearl pigment system ink layer had the circle form of ellipses (the C section (width) of 470 micrometers and the D section (length) 590 micrometer) formed by being alternately aligned at alignment intervals of the A section (length) of 400 micrometers and the B section (width) of 600 micrometers. The ink layer in the form of ellipse circle had a thickness of about 2 micrometers and the water-soluble film had a thickness of about 40 micrometers. Although what is actually sold has the whole outer surface pattern fixture layer of silver pigment ink etc. on the whole surface thereof, the present invention used the transfer film of the state before applying the whole outer surface pattern fixture layer.

(2) The plate made of ABS resin having the size of 10 cm×20 cm×3 mm was used for the article which is an object to be pattern-transferred and the transfer film was transferred on the article under water pressure in the order of the steps shown in FIGS. 3 (A) through 3 (F).

(3) There was prepared and used the activating agent of non-solvent type ultraviolet ray hardening resin composite of composition shown in Tables 1 and 2. Example 8 is one corresponding to Example 4, but using the activating agent adding methyl ethyl ketone of 20 weight % (solvent for dissolving acrylic polymer for purpose of relaxing stress when the resin was hardened and shrunk). All of the multi-functional monomer of the activating agent used in the Examples of the invention and the Comparisons and two functional monomer used in the Examples of the invention were monomers of acrylic system. Among the ingredient of a multi-functional monomer was used pentaerythritol tetraethoxy acrylate as the four functional monomer and dipentaerythritol pentaacrylate as the five functional monomer, respectively while 1.6-hexane diol diacrylate was used as the ingredient of 2 functional monomer. Furthermore, there was used the UV coating leveling agent having a frame of dimethyl polysiloxane (BYK-UV3500 manufactured by BYK Chemie, Japan (BYK is the registered trademark) as the leveling agent and the amount of addition was 0.25 weight % relative to the total weight of the multi-functional monomer and two functional monomer. Moreover, for the polymer in Tables was used acrylic polymer of 75000 weight average molecular weight for the purpose of the relaxation of stress when hardened and shrunk together with reduction of "poor shrinkage before hardening" and the polymer was dissolved in and added to the two functional monomer. In Example 8, the acrylic polymer was dissolved in and added to methyl ethyl ketone (MEK) so that the solid content of the acrylic polymer might be 40 weight %. The amount of addition of the polymer of Tables 1 and 2 was the value obtained by converting the amount of addition of the diluted solution into the solid content thereof. For the delustering agent were used polyethylene beads with an average particle diameter of 10 micrometers. The activating agent used for Examples 5 and 6 had oligomer added to the resin ingredient of composition required for the invention in an amount of degree where the design property of the concavo-convex unevenness was not damaged. In this case as well as in Comparisons 1 and 2, for the photo-polymerization oligomer was used six functional oligomer of urethane acrylate system (the weight average molecular weight of 1500 and the viscosity of 40000 Pa-s). The ingredient of the photo-polymerization oligomer used in each of Examples and Comparisons was urethane (meta) acrylate having (meta) acrylyl group as a functional group. In this case, the amount of addition of the leveling agent was 0.25 weight % relative to the total weight of the multi-functional monomer, the two-functional monomer and the photo-polymerization oligomer. The activating agent was applied to the thickness of about 20 micrometers on the print pattern of the transfer film by the wire bar coating method just before introducing the transfer film into the transfer tub.

(4) The transfer film activated in this manner was floated on the water surface in the transfer tub, after forming the concave-convex portion or unevenness by means of the repelling action (pulling action) and the collecting power of the activating agent, the article was forced through the transfer film underwater to thereby carry out the water pressure transfer, and after taking out the article out of the water, the ultraviolet rays were irradiated on the article, the water-washing and drying were performed to obtain the water pressure transfer article (decoration article 10D).

TABLE 1

| | | | EXAMPLE | | | | | | | |
|---|---|---|---|---|---|---|---|---|---|---|
| | | | 1 | 2 | 3 | 4 | 5 | 6 | 7 | 8 |
| ACTIVATING AGENT | | VOLUME SHINKAGE RATIO (%) | 20 | 13 | 18 | 17 | 15 | 11 | 13 | 17 |
| | | VISCOSITY (CPS) | 50 | 500 | 121 | 106 | 166 | 305 | 405 | 100 |
| COMPOSITION | MULTI- | NUMBER OF FUNCTIONAL GROUP | 5 | 5 | 5 | 5 | 4 | 4 | 5 | 5 |
| | FUNCTIONAL | VOLUME SHRINKAGE RATIO (%) | 15 | 15 | 15 | 15 | 9 | 9 | 15 | 15 |
| | MONOMER | VISCOSITY (CPS) | 1000 | 1000 | 1000 | 1000 | 528 | 528 | 1000 | 1000 |
| | | MOLECULAR WEIGHT | 754 | 754 | 754 | 754 | 165 | 165 | 754 | 754 |
| | TWO | VOLUME SHRINKAGE RATIO (%) | 20 | 20 | 20 | 20 | 20 | 20 | 20 | 20 |
| | FUNCTIONAL | VISCOSITY (CPS) | 7 | 7 | 7 | 7 | 7 | 7 | 7 | 7 |
| | MONOMER | MOLECULAR WEIGHT | 226 | 226 | 226 | 226 | 226 | 226 | 226 | 226 |
| | BLEND RATIO | MULTI-FUNCTIONAL MONOMER | 20 | 70 | 50 | 50 | 20 | 5 | 50 | 50 |
| | (WEIGHT PART) | TWO FUNCTIONAL MONOMER | 80 | 30 | 50 | 50 | 50 | 50 | 50 | 50 |
| | | DELUSTERIiNG AGENT | — | — | — | — | — | — | 20 | — |
| | | POLYMER | — | — | — | 10 | 10 | 20 | 5 | 10 |
| | | OLIGOMER | — | — | — | — | 30 | 45 | — | — |
| EVALUATION | COATING OPERATION EFFICIENCY | | ◯ | ◯ | ◯ | ◯ | ◯ | ◯ | ◯ | ◯ |
| | APPEARANCE DESIGN | | Δ | ◯ | ◯ | ◯ | ◯ | ◯ | ◯ | ◯ |
| | UNEVENESS DESIGN (HEIGHT DIFFERENCE OF UNEVENESS/Micrometer) | | ◎(30) | ◯(15) | ◎(24) | ◎(20) | ◯(18) | Δ(9) | ◯(15) | ◎(20) |
| | OLEIC ACID RESISTANCE PERMEABILITY | | Δ | ◎ | ◯ | ◎ | ◎ | ◎ | ◎ | ◎ |

TABLE 2

| | | | COMPARISON | | | |
|---|---|---|---|---|---|---|
| | | | 1 | 2 | 3 | 4 |
| COMPOSITION | ACTIVATING AGENT | VOLUME SHRINKAGE RATIO (%) | 9 | 9 | 8 | 21 |
| | | VISCOSITY (GPS) | 800 | 687 | 900 | 15 |
| | MULTI-FUNCTIONAL MONOMER | NUMBER OF FUNCTIONAL GROUP | — | 4 | 5 | 5 |
| | | VOLUME SHRINKAGE RATIO (%) | — | 9 | 15 | 15 |
| | | VISCOSITY (CPS) | — | 528 | 1000 | 1000 |
| | | MOLECULAR WEIGHT | — | 165 | 754 | 754 |
| | TWO FUNCTIONAL MONOMER | VOLUME SHRINKAGE RATIO (%) | 20 | 20 | 20 | 20 |
| | | VISCOSITY (CPS) | 7 | 7 | 7 | 7 |
| | | MOLECULAR WEIGHT | 226 | 226 | 226 | 226 |
| | BLEND RATIO (WEIGHT PART) | MULTI-FUNCTIONAL MONOMER | — | 5 | 90 | 10 |
| | | TWO FUNCTIONAL MONOMER | 50 | 50 | 10 | 90 |
| | | DELUSTERING AGENT | — | 10 | — | — |
| | | POLYMER | 10 | 10 | — | — |
| | | OLIGOMER | 50 | 45 | — | — |
| EVALUATION | COATING OPERATION EFFICIENCY | | ◯ | ◯ | X | ◯ |
| | APPEARANCE DESIGN | | Δ | ◯ | — | ◯ |
| | UNEVENESS DESIGN (HEIGHT DIFFERENCE OF UNEVENESS /Micrometer) | | X(5) | X(5) | — | ◎(35) |
| | OLEIC ACID RESISTANCE PERMEABILITY | | ◎ | ◯ | — | X |

All of Examples 1 through 8 used the activating agent of ultraviolet ray hardening type resin having the first and second photo-polymerization monomers blended at the predetermined ratio and having the volume shrinkage ratio of 11 to 20% and the viscosity of 50 to 500 CPS. Comparisons 1 and 2 were identical to Example 6 except that Comparison 1 used the activating agent not including the first photo-polymerization monomer (multi-functional monomer) and Comparison 2 used the activating agent having the hardening shrinkage ratio lower than that of predetermined value by replacing a part of polymer ingredient of EXAMPLE 6 by the delustering agent. Both of Comparisons 3 and 4 used the activating agent having the blend ratio of the first and second photo-polymerization monomers (multifunctional monomer and two functional monomer) departed from the predetermined ratio and Comparison 3 had the blend ratio of the first photo-polymerization monomer excessively larger than that of the second photo-polymerization monomer and Comparison 4 had the blend ratio of the second photo-polymerization monomer excessively larger than that of the first photo-polymerization monomer.

Undermost four columns of Table 1 show the results of the following evaluations on the decorative articles obtained by Examples 1 through 8 and Comparisons 1 through 4. The method and conditions of these evaluations were as follows.

(Coating Operation Efficiency)

A symbol "○" shows the better coating operation while a symbol "X" shows the difficult coating operation when each activating agent was coated by the wire coating method on the print pattern of the transfer film to the thickness of about 20 micrometers just before introducing the transfer film into the transfer tub.

(Appearance Design)

A symbol "○" shows no occurrence of poor design on the peripheral edge of the decorative article caused by excessive hardening shrinkage, a symbol "Δ" shows no occurrence of trouble even though such poor design occurs and a symbol "X" shows poorness of the decorative article because of occurrence of such poor design.

(Concavo-Convex Unevenness Design)

In case of the height difference of the surface unevenness of the decorative articles was measured by the laser beam microscope (VK8710 manufactured by KEYENCE CORP.), a symbol "X" shows that the height difference was less than 6 micrometers, a symbol "Δ" shows that the height difference was 6 or more micrometer and less than 10 micrometers, a symbol "○" shows that the height difference was 10 or more micrometers and less than 20 micrometers and a symbol "◎" shows that the height difference was 20 or more micrometers.

(Interruption of Permeation of Oleic Acid)

Test liquid (having solvent of petroleum benzene) containing oleic acid of 0.2 ml was extracted and dropped on the surface of the unevenness design, which was placed within an oven of 80° C. for 24 hours. Thereafter, the articles to be tested were taken out from the oven and then cooled naturally to the room temperature. Then, the oil component on the surface of the article to be tested was wiped off. Thereafter, the adhesion was evaluated by tearing off the surface of the article by the "Cellotape" by Nichiban Co., Ltd. (registered trademark). In this evaluation, a symbol "○" shows no change in appearance (swelling etc.) of the print layer (surface decorative layer) or no peeling of the print layer, a symbol "Δ" shows the case where no peeling was observed (there was no problem for the product) even though the appearance changed and a symbol "X" shows that there occur both of change in appearance and peeling.

There will be found the following matters from the result of evaluation of Examples 1 through 8 of Table 1.

(1) Since the activating agent has the main ingredients of ultraviolet ray hardening type resin having the first photo-polymerization monomer of three or more functional groups and the second photo-polymerization monomer of two functional groups blended at the predetermined ratio and had the predetermined volume shrinkage ratio, viscosity and ink solubility, there could be obtained the larger height difference of the unevenness, which cannot be accomplished by the prior art and therefore there could be obtained the design to which the real cubic effect was imparted. Although Table 1 does not describe any ink solubility, it will be apparent from no recognition of any fault caused by the ink solubility when visually determining the state of the pattern design of the decorative article that the activating agent described in Examples had the ink solubility of SP value of 7 or more, which is equivalent to the prior art activating agent or a level having no trouble in practice.

(2) With the ingredients of the activating agent aforementioned, since the oleic acid resistance permeability was good and there was high resistance to the degradation of hardened tunic caused by dirt such as skin fat in contact with the human body (mainly hand), it will be understood that there was a high design durability required for use in cars etc. exposed especially to high temperature environment.

(3) It will be noted from the comparison of Examples 3 and 4 with Comparison 1 that although the prior art activating agent of Comparison 1 formed of photo-polymerization oligomer and two functional monomer had the good oleic acid resistant permeability, it had poor height difference of the unevenness while the activating agent of Examples 3 and 4 was contributed to the improvement of the oleic acid resistant permeability while maintaining the large height difference of the unevenness by using multi-functional monomer in place of the photo-polymerization oligomer.

(4) It will be noted from the results of Comparisons 1 through 4 in Table 2 that as the volume shrinkage ratio of the activating agent was lower than the lower limit of the range of the invention, then there could not be obtained the fully larger height difference of the unevenness and reversely as it was larger than the upper limit, then there could be obtained the larger height difference of the unevenness, but the oleic acid resistance permeability was considerably lowered because the hardening shrinkage was too larger whereby there occurred a crack in the hardened coating film.

(5) With respect to the blend ratio of the first and second photo-polymerization monomers, as the blend ratio of the first photo-polymerization monomer relative to that of the second photo-polymerization monomer was largely and excessively departed from the predetermined blend ratio of the invention as in Comparison 3, the shrinkage ratio was lowered and the viscosity of the activating agent was extremely higher with the result that the activating agent could not be coated and reversely as the blend ratio of the second photo-polymerization monomer relative to that of the first photo-polymerization monomer was largely and excessively departed from the predetermined blend ratio of the invention as in Comparison 4, the shrinkage ratio got excessively larger to thereby lower the oleic acid resistance permeability.

(6) It will be noted from the comparison of the tactile finger feeling of Examples 1 and 6 that as the acrylic polymer was added, there could be obtained a smooth tactile finger feeling even with the same height difference of the unevenness. This will be guessed from the result that the concave-convex unevenness was formed in the state of smaller roughness on the surface after hardened and shrunk by means of the velocity of hardening shrinkage of the activating agent and the stress relaxation action due to the addition of the acrylic polymer.

(7) It will be noted from Examples 4, 5 and 7 that even though there were suitably added the polymer, photo-polymerization oligomer and also the delustering agent, since they were within the range of predetermined volume shrinkage ratio and predetermined viscosity, there could be the large height difference of the concavo-convex unevenness and therefore there could be realized the design to which the real cubic effect was imparted.

(8) It will be noted that in Example 8, in spite of the solvent (MEK) included in order to properly set the weight % of the acrylic polymer, there could be the larger height difference of the concavo-convex unevenness and there could be realized the design to which the real cubic effect was imparted. This is because the solvent in this Example was added maintaining the characteristic (solvent power) and the amount of addition which did not damage the activation of the print pattern by the photo-polymerization monomer to bear the activation of the print pattern as already stated.

INDUSTRIAL APPLICABILITY

According to the invention, there is obtained the larger height difference of the concave-convex unevenness to thereby further improve the tactile feeling of the cubic concave-convex unevenness without lowering the membrane performances (abrasion resistance and medical resistance such as oleic acid resistance, etc.) of the surface decoration layer.

The invention claimed is:

1. A method for activating a print pattern of a transfer film formed by applying the print pattern on a water-soluble film with an activating agent and thereafter carrying out a water pressure transfer of said print pattern on a surface of an article, said method comprising the steps of preparing said transfer film having said print pattern including a first area of an ink layer and a second area of no ink layer or an ink layer thinner than that of said first area and having a whole outer surface exposed; forming activating agent convex collection portions by protruding on said surface of said article a surplus portion of said activating agent which is applied onto said surface of said transfer film to activate an ink of said first area while said surplus portion of said activating agent is collected in said second area by being pushed by said surface of said article on said water pressure transfer; and shrinking said activating agent convex collection portion when said print pattern on said article is hardened whereby a portion corresponding to said second area projects beyond an ink print portion corresponding to said first area to thereby form a decorative layer having a three-dimensional unevenness shape imparted to said surface of said article, said activating agent characterized by including ultraviolet ray hardening resin composite to be applied to the surface of said transfer film having at least resin main component including first photo-polymerization monomer A of three or more functional groups and second photo-polymerization monomer B of two functional groups and photo-polymerization initiator, said first and second photo-polymerization monomers being blended so as to be a whole volume shrinkage ratio of 10 to 20% and a viscosity of 100 to 500 CPS.

2. A water pressure transfer method as set forth in claim 1, and wherein said first photo-polymerization monomer has a volume shrinkage ratio of 5 to 35%, a molecular weight of 1500 or more and a viscosity of 50 to 6000 CPS.

3. A water pressure transfer method as set forth in claim 2, and wherein said second photo-polymerization monomer has a volume shrinkage ratio of 10 to 22%, a molecular weight of 1500 or more and a viscosity of 3 to 30 CPS.

4. A water pressure transfer method as set forth in claim 2, and wherein the resin component of activating agent has the blend ratio of 20 to 70 weight % of said first photo-polymerization monomer of three or more functional groups and 30 to 80 weight % of said second photo-polymerization monomer of two functional groups.

5. A water transfer article characterized by comprising a decorative layer having a surface of three-dimensional unevenness formed by the water pressure transfer method according to claim 2, said three-dimensional unevenness including the projection portion formed by the surplus portion of the activating agent for activating the first area having the ink layer of the print pattern of the transfer film to become said decorative layer on the second area having no ink layer or an ink layer thinner than that of said first area.

6. A water pressure transfer method as set forth in claim 1, and wherein said second photo-polymerization monomer has a volume shrinkage ratio of 10 to 22%, a molecular weight of 1500 or more and a viscosity of 3 to 30 CPS.

7. A water pressure transfer method as set forth in claim 6, and wherein the resin component of activating agent has the blend ratio of 20 to 70 weight % of said first photo-polymerization monomer of three or more functional groups and 30 to 80 weight % of said second photo-polymerization monomer of two functional groups.

8. A water transfer article characterized by comprising a decorative layer having a surface of three-dimensional unevenness formed by the water pressure transfer method according to claim 6, said three-dimensional unevenness including the projection portion formed by the surplus portion of the activating agent for activating the first area having the ink layer of the print pattern of the transfer film to become said decorative layer on the second area having no ink layer or an ink layer thinner than that of said first area.

9. A water pressure transfer method as set forth in claim 1, and wherein the resin component of activating agent has the blend ratio of 20 to 70 weight % of said first photo-polymerization monomer of three or more functional groups and 30 to 80 weight % of said second photo-polymerization monomer of two functional groups.

10. A water transfer article characterized by comprising a decorative layer having a surface of three-dimensional unevenness formed by the water pressure transfer method according to claim 9, said three-dimensional unevenness including the projection portion formed by the surplus portion of the activating agent for activating the first area having the ink layer of the print pattern of the transfer film to become said decorative layer on the second area having no ink layer or an ink layer thinner than that of said first area.

11. A water transfer article characterized by comprising a decorative layer having a surface of three-dimensional unevenness formed by the water pressure transfer method according to claim 1, said three-dimensional unevenness including the projection portion formed by the surplus portion of the activating agent for activating the first area having the ink layer of the print pattern of the transfer film to become said decorative layer on the second area having no ink layer or an ink layer thinner than that of said first area.

12. A water pressure transfer method as set forth in claim 1, and wherein the resin component of activating agent has the blend ratio of 20 to 70 weight % of said first photo-polymerization monomer of three or more functional groups and 30 to 80 weight % of said second photo-polymerization monomer of two functional groups.

13. An activating agent to be used for a method for activating a print pattern of a transfer film formed by applying the print pattern on a water-soluble film with an activating agent and thereafter carrying out a water pressure transfer of said print pattern on a surface of an article, said method comprising the steps of preparing said transfer film having said print pattern including a first area of an ink layer and a second area of no ink layer or an ink layer thinner than that of said first area and having a whole surface exposed; forming activating agent convex collection portions by protruding on said surface of said article a surplus portion of said activating agent which is applied onto said surface of said transfer film to activate an ink of said first area while said surplus portion of said activating agent is collected in said second area by being pushed by said surface of said article on said water pressure transfer; and shrinking said activating agent convex collection portion when said print pattern on said article is hardened whereby a portion corresponding to said second area projects beyond an ink print portion corresponding to said first area to thereby impart a three-dimensional unevenness shape to said surface of said article, said activating agent characterized by including ultraviolet ray hardening resin composite to be applied to the surface of said transfer film having at least resin main component including first photo-polymerization monomer A of three or more functional groups and second photo-polymerization monomer B of two functional groups and photo-polymerization initiator, said first and second photo-polymerization monomers being blended so as to be a whole volume shrinkage ratio of 10 to 20% and a viscosity of 100 to 500 CPS.

14. An activating agent as set forth in claim 13, wherein said first photo-polymerization monomer has a volume shrinkage ratio of 5 to 35%, a molecular weight of 1500 or more and a viscosity of 50 to 6000 CPS.

15. An activating agent as set forth in claim 14, and wherein said second photo-polymerization monomer has a volume shrinkage ratio of 10 to 22%, a molecular weight of 1500 or more and a viscosity of 3 to 30 CPS.

16. An activating agent as set forth in claim 14, and wherein the resin component of activating agent has the blend ratio of 20 to 70 weight % of said first photo-polymerization monomer of three or more functional groups and 30 to 80 weight % of said second photo-polymerization monomer of two functional groups.

17. An activating agent as set forth in claim 13, and wherein said second photo-polymerization monomer has a volume shrinkage ratio of 10 to 22%, a molecular weight of 1500 or more and a viscosity of 3 to 30 CPS.

18. An activating agent as set forth in claim 17, and wherein the resin component of activating agent has the blend ratio of 20 to 70 weight % of said first photo-polymerization monomer of three or more functional groups and 30 to 80 weight % of said second photo-polymerization monomer of two functional groups.

19. An activating agent as set forth in claim 13, and wherein the resin component of activating agent has the blend ratio of 20 to 70 weight % of said first photo-polymerization monomer of three or more functional groups and 30 to 80 weight % of said second photo-polymerization monomer of two functional groups.

* * * * *